April 28, 1959     T. E. PIAZZE     2,883,913
METHOD AND MACHINE FOR MAKING A DRAWSTRING BAG
Filed Jan. 21, 1958     10 Sheets-Sheet 1

INVENTOR.
Thomas E. Piazze.
BY
Cromwell, Greist + Warden

April 28, 1959 T. E. PIAZZE 2,883,913
METHOD AND MACHINE FOR MAKING A DRAWSTRING BAG
Filed Jan. 21, 1958 10 Sheets-Sheet 2
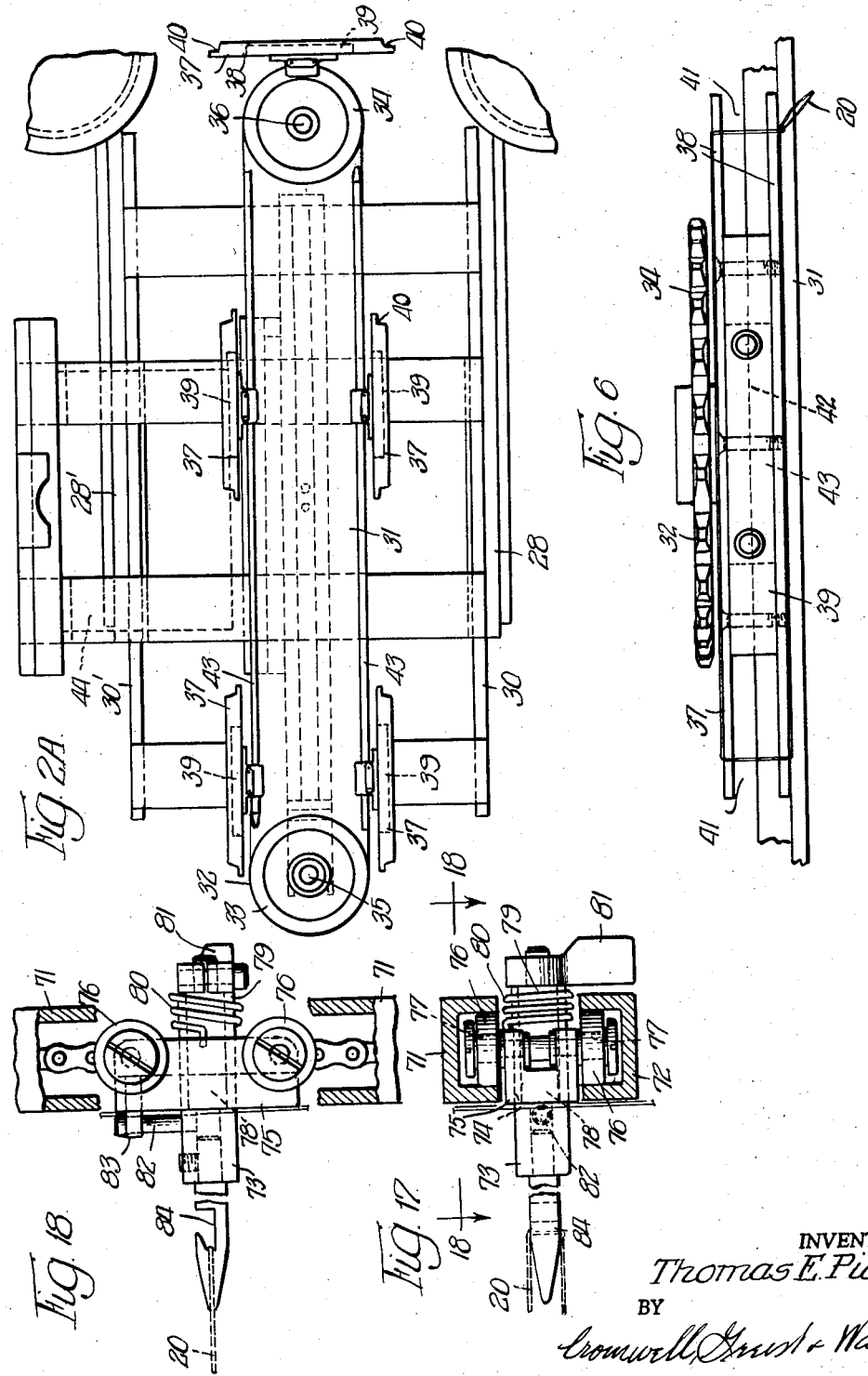
INVENTOR.
Thomas E. Piazze,
BY
Cromwell, Greist & Warden
Attys.

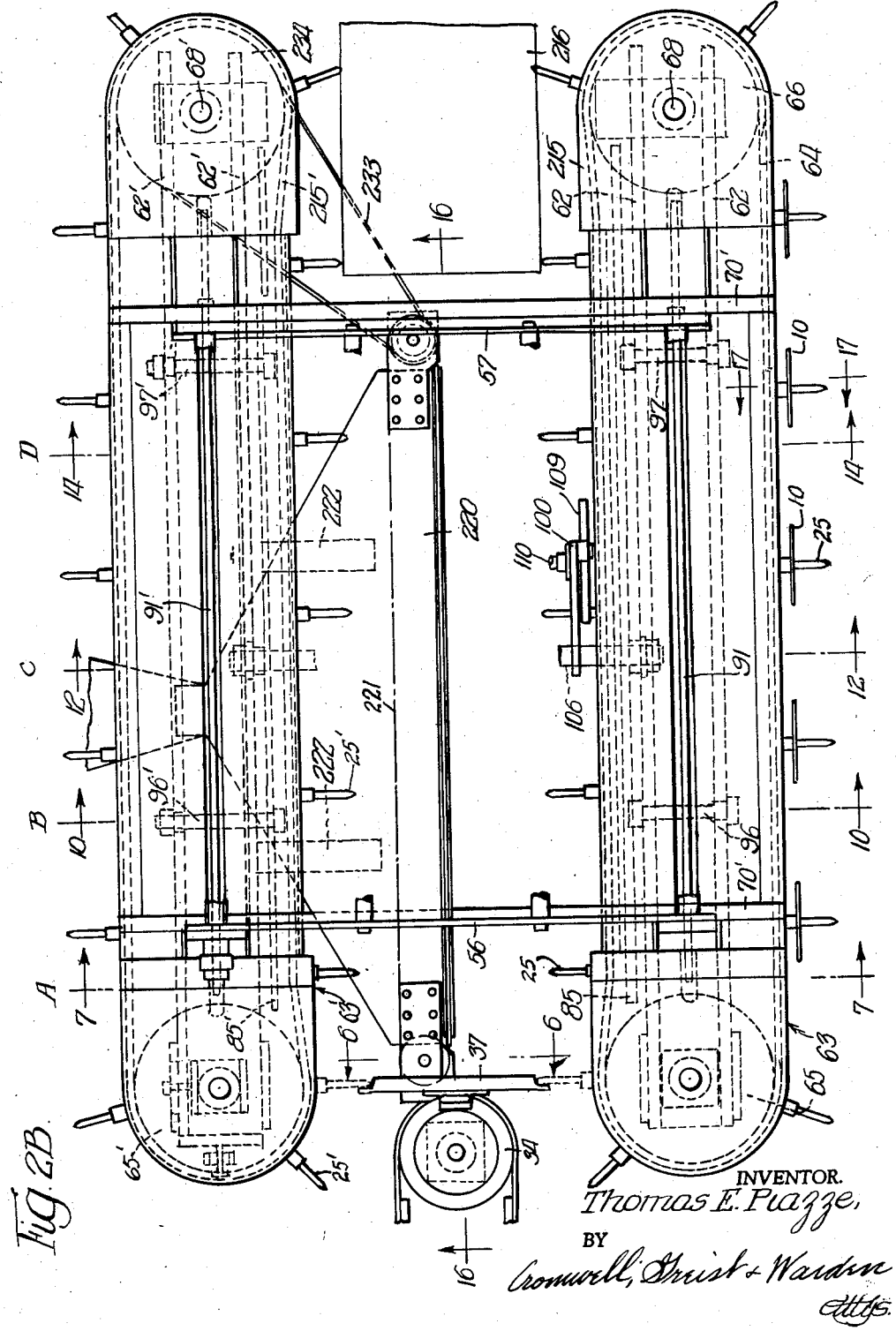

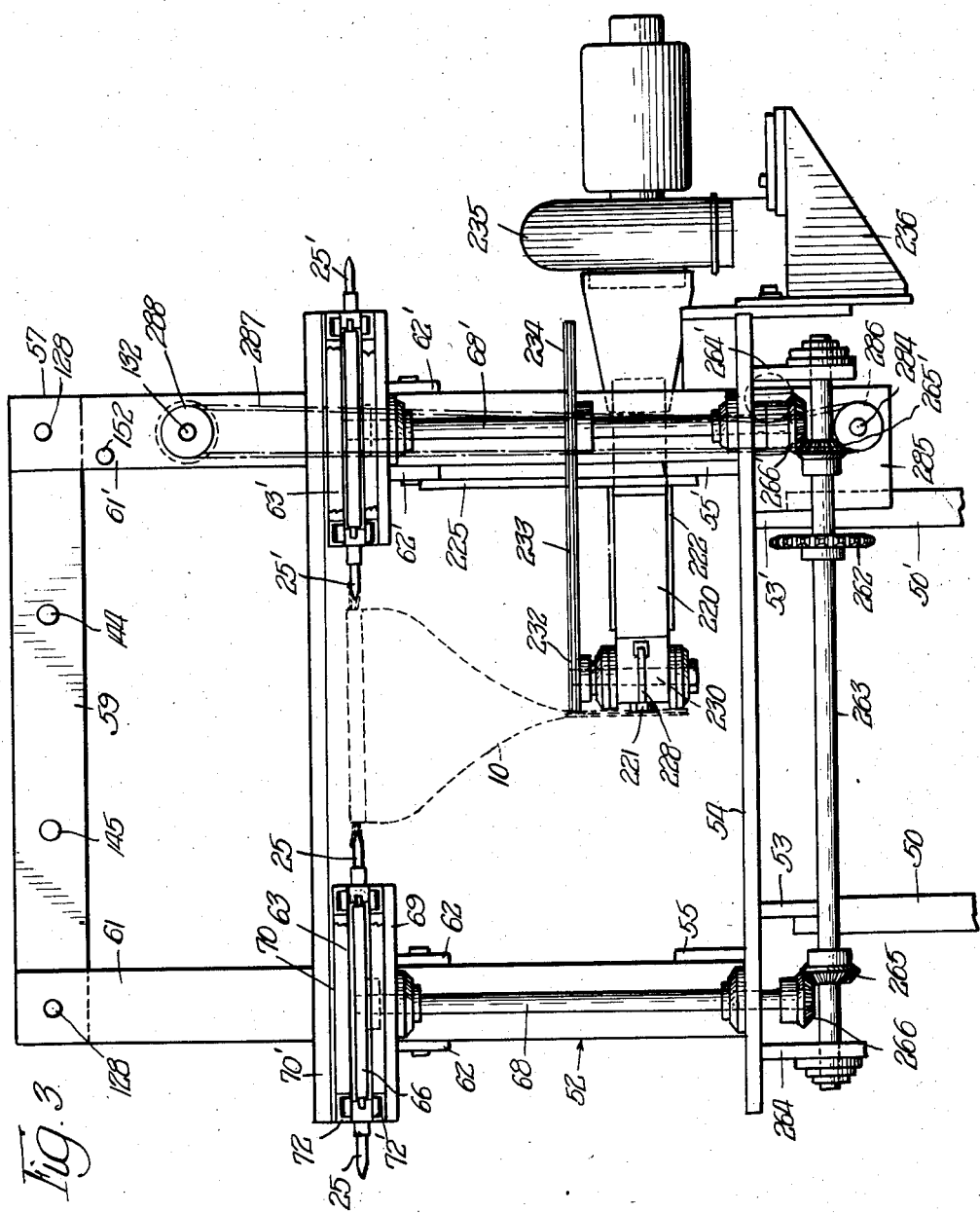

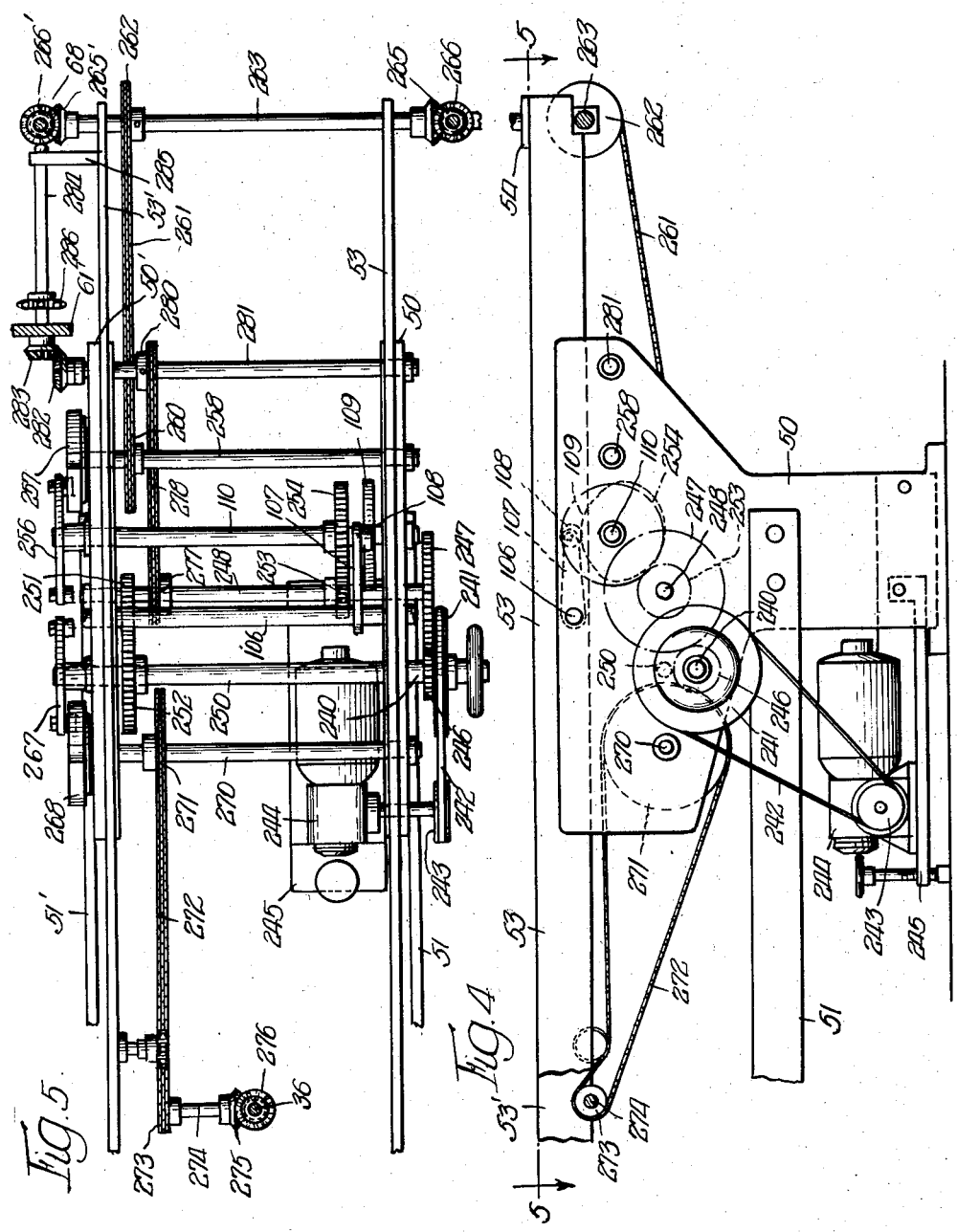

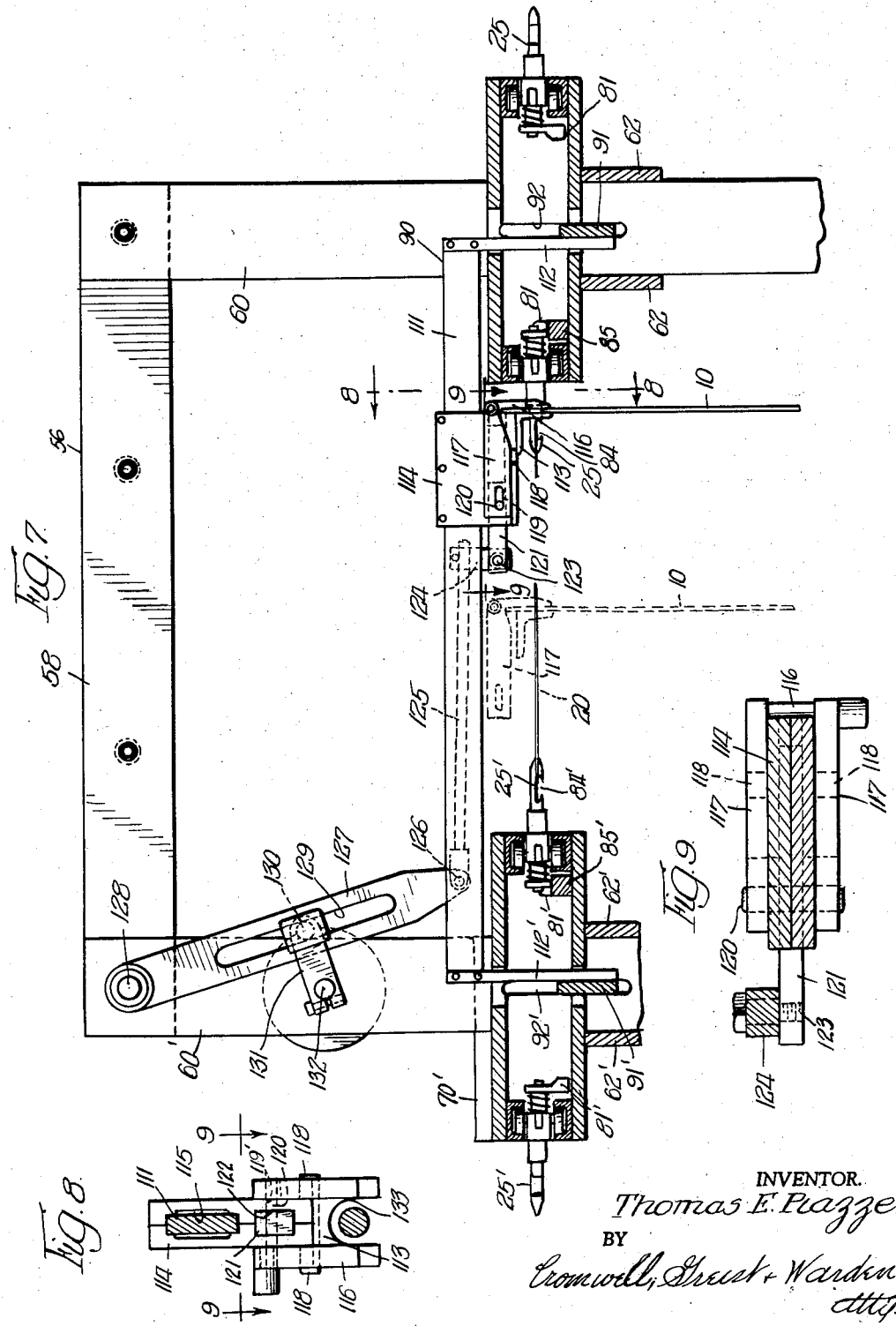

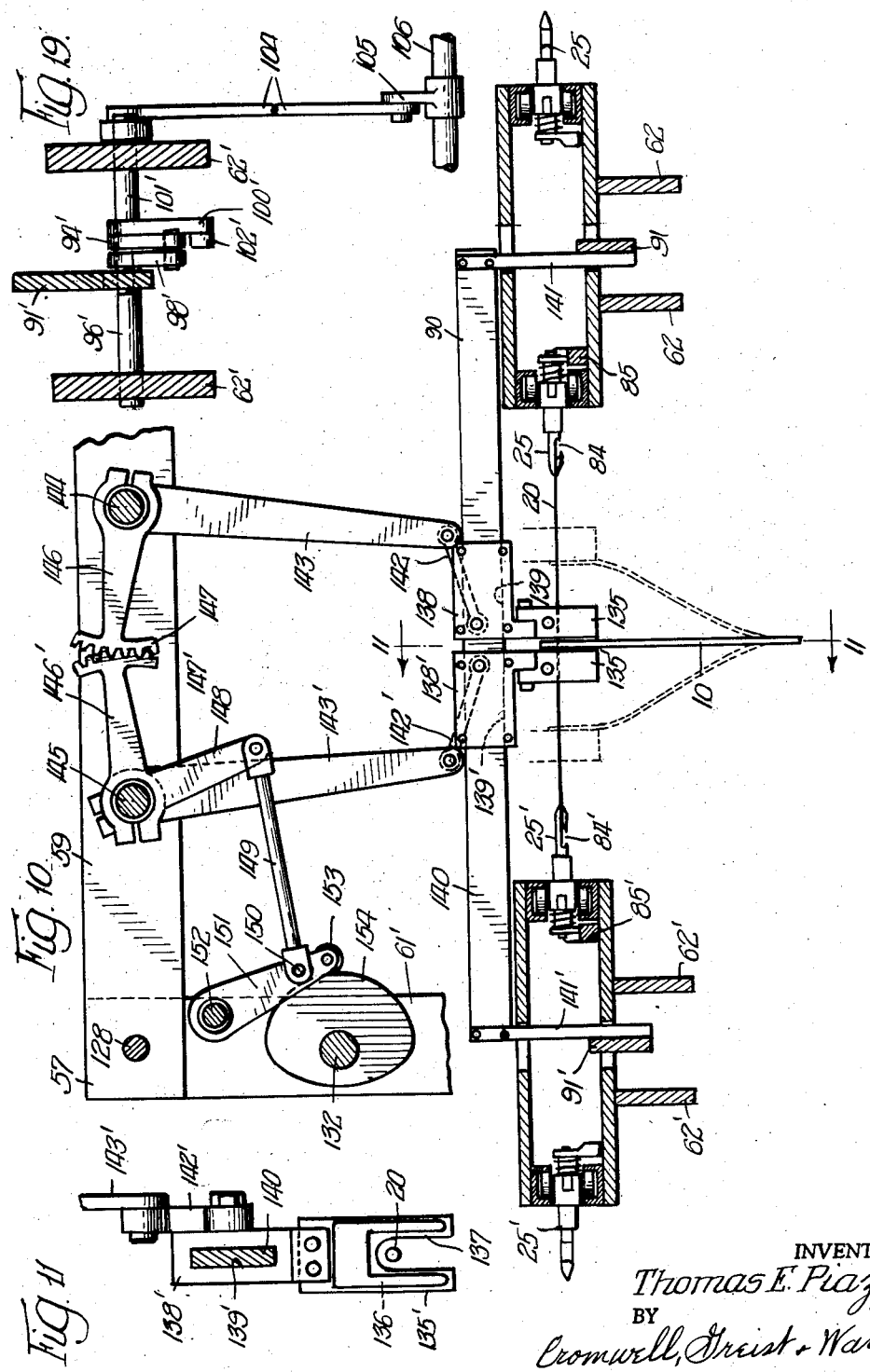

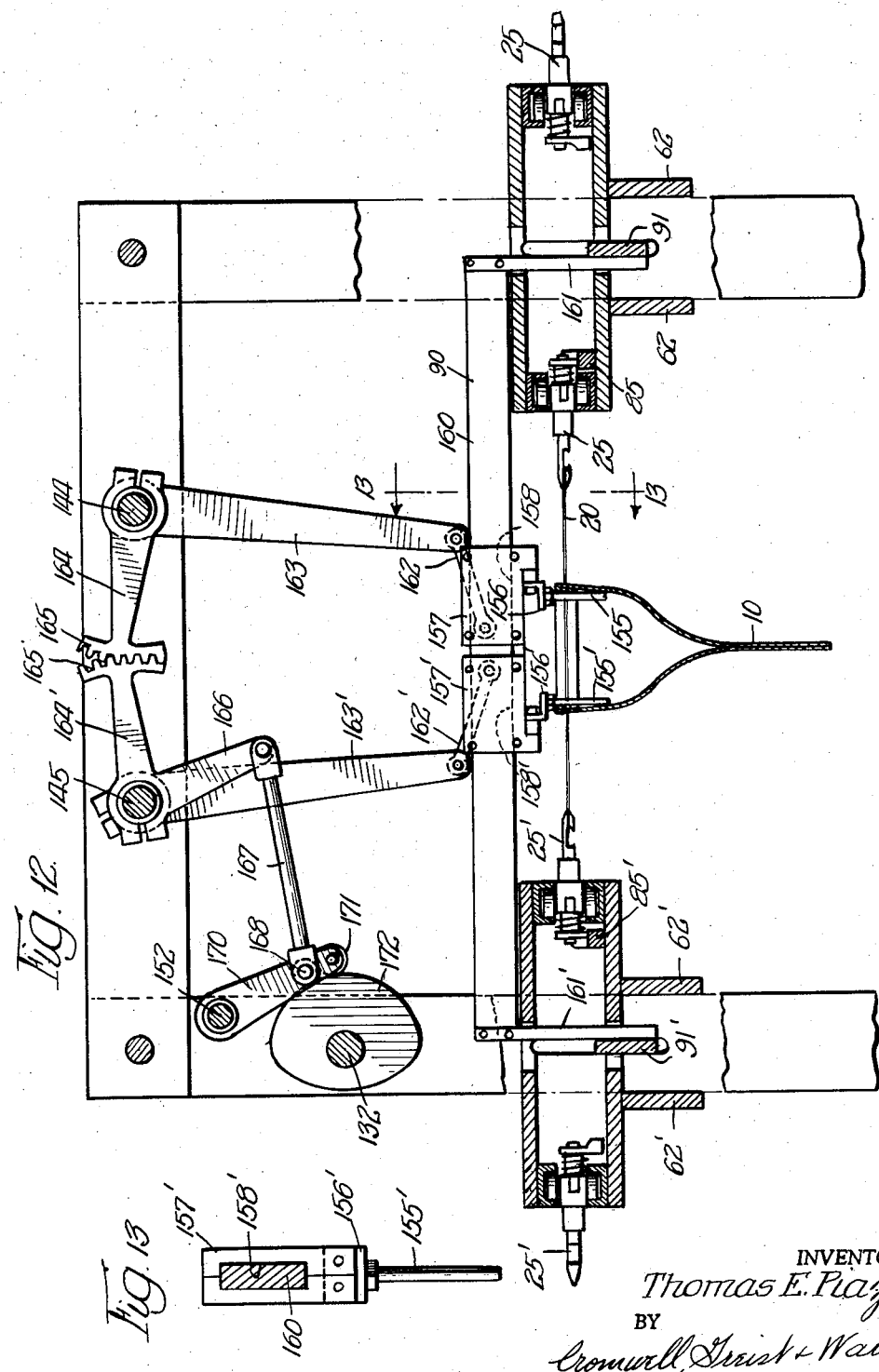

April 28, 1959     T. E. PIAZZE     2,883,913
METHOD AND MACHINE FOR MAKING A DRAWSTRING BAG
Filed Jan. 21, 1958     10 Sheets-Sheet 9
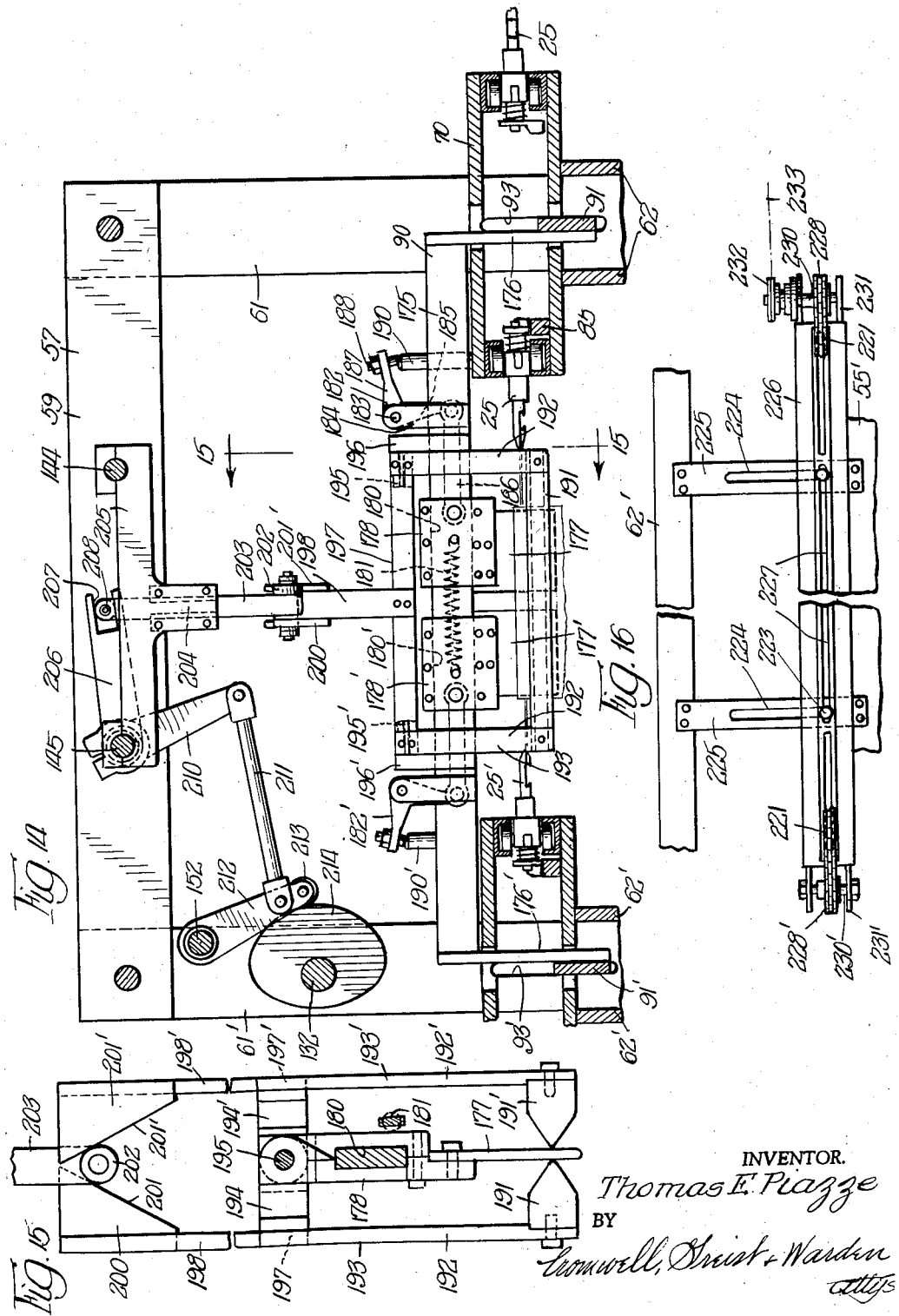
INVENTOR.
Thomas E. Piazze
BY
Cromwell, Greist & Warden
Attys April 28, 1959 T. E. PIAZZE 2,883,913
METHOD AND MACHINE FOR MAKING A DRAWSTRING BAG
Filed Jan. 21, 1958 10 Sheets-Sheet 10
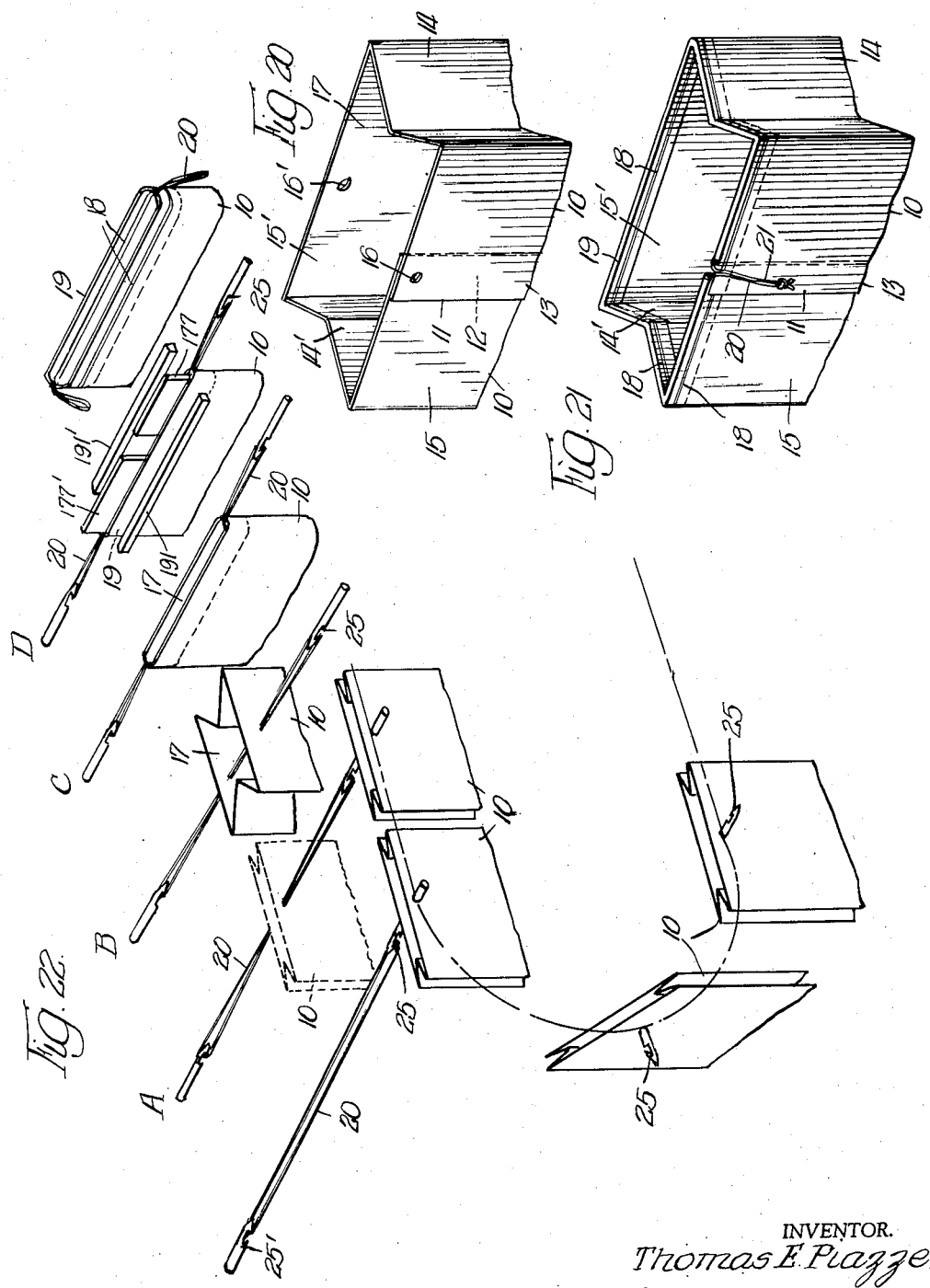
INVENTOR.
Thomas E. Piazze,
BY
Cromwell, Greist & Warden
Attys United States Patent Office 2,883,913
Patented Apr. 28, 1959

2,883,913

METHOD AND MACHINE FOR MAKING A DRAWSTRING BAG

Thomas E. Piazze, Mount Vernon, Ohio, assignor to Continental Can Company, Inc., New York, N.Y., a corporation of New York Application January 21, 1958, Serial No. 710,298

36 Claims. (Cl. 93—8)

This invention relates to the manufacture of receptacles and is more particularly concerned with improvements in a machine and method for providing the mouth of a flexible bag with a drawstring closure.

In the packaging of fresh produce such as fruits and vegetables or the like, tube-like bags have long been employed which are of loosely woven fabrics and which are closed by means of a drawstring encased in a hem formed in the marginal portions of the mouth of the bag, since it is necessary to permit access of air to the packaged produce so that it may breathe and thus retain its freshness and flavor. Efforts have been made to provide bags suitable for packaging produce which are fabricated from plastic films and perforated to provide the necessary ventilation, such bags being provided with drawstring closures of the same general character as the fabric bags which they are adapted to replace. However, in attempting to supply a satisfactory plastic film bag of this type, difficulty has been encountered in manfacturing the film bags with sufficient economy to compete with the fabric bags, and, therefore, a general object of this invention is to provide a method and apparatus for use in economically manufacturing produce bags which are fabricated from plastic films and which are provided with drawstring closures.

More specifically, it is an object of the invention to provide an apparatus for automatically applying a drawstring to the mouth of a bag forming section of flexible plastic tubing and encasing the drawstring in a suitable hem formed in the marginal edges of the bag mouth.

It is a further object of the invention to provide a method and apparatus for applying a drawstring closure to the mouth of a plastic film bag wherein the drawstring in the form of a loop is threaded through aligned apertures adjacent the marginal edges of the bag mouth and the string is stretched between two points, the mouth of the bag is opened while it is suspended on the string, the marginal portions of the bag walls are folded downwardly and inwardly between separated portions of the string and secured to the inner surface of the bag walls to provide a hem formation enclosing the string portions, after which the looped string is released to permit one end thereof to be drawn through the aperture in the one wall of the bag, leaving the other end of the loop projecting through the aperture in the opposite wall of the bag where it is readily accessible for closing the mouth of the bag.

It is another object of the invention to provide an apparatus for applying a drawstring closure to the mouth of a flexible bag formed of relatively thin transparent heat sealable film material wherein a string is formed in looped arrangement and threaded through aligned holes which are provided adjacent the top of the bag and in oppositely disposed margins thereof, the looped string is drawn taut between two spaced points and the bag mouth is opened while it is on the string to bring predetermined wall portions thereof into opposed relation, the marginal portions of the bag are folded down into the bag over the drawstring and secured by heat sealing to the adjoining inside wall portions of the bag to form therein a hem for encasing the drawstring, and the drawstring is released to permit the one end to be drawn through the aperture which positions the drawstring in the hem with one end only extending through the one aperture.

These and other objects and advantages of the invention will be apparent from a consideration of the method and apparatus hereinafter described and illustrated in the accompanying drawings wherein:

Figure 2A is a plan view, to an enlarged scale, of a portion of the machine, which is adapted to provide looped strings for application to successive bags, portions thereof being shown diagrammatically;

Figure 2B is a plan view, to an enlarged scale, of the remaining portion of the machine which is adapted to assemble the looped string with the bag mouth and encase the same in a hem formation, portions being broken away and other portions being shown diagrammatically;

Figure 3 is an elevation taken at the discharge end of the machine to a still larger scale;

Figure 4 is a partial front elevation of the machine, to an enlarged scale;

Figure 5 is a partial horizontal section taken on the line 5—5 of Figure 4;

Figure 6 is a fragmentary cross section taken on the line 6—6 of Figure 2B, to an enlarged scale;

Figure 7 is a partial cross section taken on the line 7—7 of Figure 2B, to an enlarged scale;

Figure 8 is a fragmentary cross section taken on the line 8—8 of Figure 7, to a larger scale;

Figure 9 is a fragmentary section taken on the line 9—9 of Figure 7, to a larger scale;

Figure 10 is a partial cross section taken on the line 10—10 of Figure 2B, to an enlarged scale;

Figure 11 is a fragmentary section taken on the line 11—11 of Figure 10, to a larger scale;

Figure 12 is a partial cross section taken on the line 12—12 of Figure 2B, to an enlarged scale;

Figure 13 is a fragmentary section taken on the line 13—13 of Figure 12 to a larger scale;

Figure 14 is a partial cross section taken on the line 14—14 of Figure 2B, to an enlarged scale;

Figure 15 is a fragmentary section taken on the line 15—15 of Figure 14, to a larger scale;

Figure 16 is a fragmentary section taken on the line 16—16 of Figure 2B, to an enlarged scale;

Figure 17 is a fragmentary section taken on the line 17—17 of Figure 2B, to an enlarged scale;

Figure 18 is a fragmentary section taken on the line 18—18 of Figure 17;

Figure 19 is a fragmentary section taken on the line 19—19 of Figure 1, to an enlarged scale;

Figure 20 is a perspective view of the top portion of a bag in the condition in which it is fed to the present apparatus for application of the drawstring closure, the bag walls being shown partially expanded into an open position;

Figure 21 is a perspective view of the top portion of the bag with the drawstring closure applied thereto and with the bag walls expanded into a partially open position ready for insertion of merchandise therein; and Figure 22 is a perspective view showing diagrammatically the operations performed on the bag in applying the drawstring closure to the same.

Figure 1:
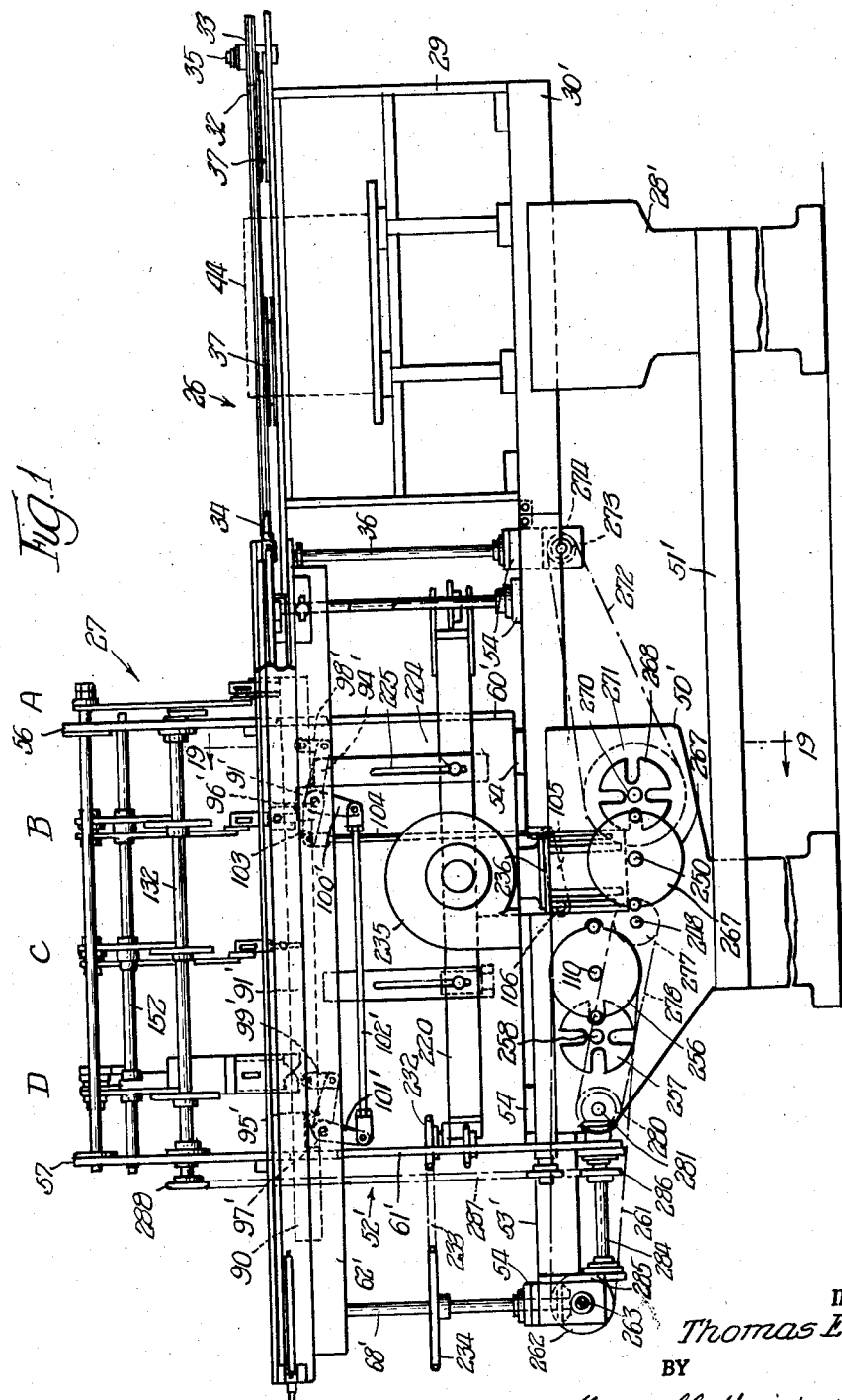
Figure 1 is a rear side elevation of a machine which is adapted to automatically apply drawstring closures to the mouths of successive plastic bags which are delivered to the same, certain portions of the machine being broken away and other portions being shown diagrammatically.

The invention will be best understood by reference first to Figures 20 to 22 of the drawings wherein the structure of the bag top and the method of applying the drawstring closure to the same are illustrated.

The bag structure 10 (Figures 20 and 21) which is fed to the machine for the application of the drawstring closure is preferably in the form of a tubular section which may be fabricated as a seamless tube or formed from a web or sheet of relatively flexible heat sealable material with overlapping side edges or margins 11 and 12 which are joined by heat sealing to form the seam 13 extending axially or longitudinally of the bag. The bag forming material may be Pliofilm, polyethylene or any other suitable heat sealable continuous plastic film. A cross seal (not shown) may be provided at one end of the tubular section to form the bottom closure for the bag. Also, the bag may be collapsed into flattened condition with infolded sides as indicated at 14, 14' bringing oppositely disposed wall forming portions 15 and 15' into face-to-face relation with the infolded sides between the same. In its initial condition in which the bag is formed preparatory to the application of the drawstring, the two side walls 15, 15' are provided with apertures 16 and 16' which are aligned when the bag is in flattened condition with the walls 15 and 15' in face-to-face relation, the apertures 16 and 16' being spaced a predetermined distance below the top edge of the bag and being located so that the one aperture 16 falls within the overlapped double thickness marginal seam portions 11 and 12.

When the drawstring closure is applied to the bag 10 the marginal end portion 17 of the bag walls is folded inwardly and seamed or sealed along the line 18 to form a hem 19 which provides a guideway for a drawstring 20, the latter being in the form of an endless loop with the major portion confined within the hem 19 and having an end portion 21 which extends through the aperture 16 in the wall 15 of the bag and which is accessible for the closure operation.

The method of forming the drawstring closure in the mouth of the bag 10 is illustrated in Figure 22 with the successive operations which are carried out by the machine of the present invention being shown schematically. Briefly, the method comprises initially supporting successive bags 10 on laterally projecting pins 25 carried on one of a pair of laterally spaced horizontal conveyors which carry the bags in a predetermined path between opposed inner runs thereof for the successive string applying operations. The bags 10 are fed laterally to the pins 25 on one of the conveyors by manual or automatic feed. Each successive bag is placed on a conveyor carried pin 25 with the latter passing through the apertures 16 and 16' so as to support the bag as it is advanced by the conveyor. Each pin 25 has a hook formation on the end which is adapted to pick up one end of the looped string formation 20, the other end being picked up by the cooperating pin 25' on the opposite conveyor, and the looped string 20 being delivered to the pins by a series of string mandrels on a cooperating string supplying mechanism. Upon the string 20 being picked up by the pins 25, 25' the latter move apart and rotate axially through 90 degrees to place the string under tension and move the two legs formed by the loop into a horizontal plane as the pins 25, 25' move the string to the first work station A where the bag is moved off the pin 25 and positioned near the middle of the stretched string. The bag walls 15 and 15' are gripped at station B and moved apart to spread the bag top on the string 20. With the bag top in open position at station C the top marginal portions 17 of the walls thereof are folded down into the inside of the bag between the two spaced legs of the looped string 20. The hem 19 is then formed at station D by applying the seal 18 which encloses the middle portion of the two legs of the string 20 within the hem 19. As the bag is advanced after the hem 19 is formed, the string tensioning and carrying pins 25, 25' are moved toward each other a sufficient distance to release the string 20 and discharge the finished bag from the machine. Thereafter, one of the exposed ends of the looped string 20, for example the end 21 which extends through the aperture 16, is pulled and the other end, which extends through the aperture 16', moves into the hem 19 leaving the bag top in the condition shown in Figure 21.

The machine for applying the drawstring closures 20 to the mouths of the bags 10 comprises a string looping end tying mechanism 26 (Figures 1, 2A and 2B) and a string applying mechanism 27, which are arranged on aligned supporting frames with the former supplying successive strings in looped formation and the latter applying the strings to successive bags which are fed thereto by one or more operators or by a suitable automatic feeding device. The two mechanisms 26 and 27 are connected in tandem relation and driven from a single source of power.

The string looping and tying apparatus 26 is supported on laterally spaced upright base members 28, 28' and a frame superstructure 29 projecting above longitudinal side support rails or plates 30, 30' mounted on the base members 28, 28'. The superstructure 29 carries a horizontal support plate 31 and an endless chain conveyor 32 mounted thereon for movement in a horizontal plane. The conveyor chain 32 has its opposite ends supported on end sprockets 33 and 34. The sprocket 33 is mounted on a vertically extending idler shaft 35 journaled in a suitable bearing bracket at one end of the support plate 31 and the sprocket 34 is mounted on the upper end of a driven shaft 36 at the other end of the plate 31 adjoining the string applying mechanism 27. The conveyor chain 32 is spaced immediately above the support plate 31 and carries a series of spaced mandrels 37 which travel in a horizontal path below the chain 32. The mandrels 37 are of a length sufficient to support a looped string 20 of the size required for the closure. Each mandrel comprises a pair of relatively narrow elongate plates 38 (Figures 2A and 6) which are secured in vertically spaced relation on the top and bottom faces of an outwardly extending portion of a support block 39 which is of less length than the plates 38 so that the ends of the latter extend beyond the block 39 and are cut out at each outside corner at 40 to provide a groove or recess for receiving the string 20. The plates 38 extend a sufficient distance beyond each end of the support block 39 to provide recesses 41 at opposite ends of the mandrel 37 for accommodating the string supporting pins 25, 25' on the string applying mechanism 27, permitting the pins 25, 25' to pass through the recesses 41 and pick off the looped string 20. The mandrel support blocks 39 are grooved at 42 to form a guideway for guide tracks 43 mounted on the support plate 31.

A string cutting and knotting device indicated at 44 (Figures 1 and 2A) is provided on the superstructure 29 which is operated in timed relation to the movement of the mandrel conveyor 32 to apply on each successive mandrel 37 a length of string with the ends knotted to form the endless loop 20. The details of the string looping and knotting device 44 are not shown since this mechanism does not form a part of the present invention and any commercially available tying device may be used with the present apparatus. The conveyor 32 is operated intermittently with the vertical drive shaft 36 being connected with the drive mechanism for the string applying mechanism 27.

The string applying mechanism 27 (Figures 1 and 3) comprises a pair of upright laterally spaced supporting base members 50, 50' which are tied to the supporting base members 28, 28' of the string tying mechanism by longitudinal side rails 51, 51'. The base members 50, 50' support an upper frame structure 52 on a pair of parallel laterally disposed side rails 53, 53' which extend along the top edges of the base members 50, 50' in longitudinal alignment with the corresponding side rails 30, 30' on the base members 28, 28'. A series of spaced cross bars or plates 54 extend in longitudinally spaced relation across the side rails 53, 53' and support in turn parallel longitudinally extending bottom side plates 55, 55' which are spaced outwardly of the side rails 53, 53'. Upright inverted U-shaped end or cross frames 56 and 57 (Figures 1, 3 and 7) are attached to opposite ends of the side plates 55, 55' which are formed by top cross plates 58 and 59 and by depending leg or side plates 60, 60' and 61, 61', respectively. The end frame legs on each side of the machine carry, in laterally spaced paired relation, support plates or rails 62 and 62' on which are mounted laterally spaced endless chain conveyors 63 and 63' which are arranged to travel in a common horizontal plane with opposed runs thereof parallel and in oppositely disposed relation. These conveyors are identical, and only one will be described in detail, with corresponding parts on the other being indicated by the same numerals primed.

The conveyor 63 comprises an endless chain 64 (Figures 1, 2B and 3) which is mounted on end sprockets 65 and 66, the former being secured on the upper end of the vertical shaft 67 and the latter being secured on the upper end of the vertical shaft 68 with both of the vertical shafts being journaled in suitable bearings in a horizontal base plate 69 supported on the upper edges of the longitudinal support rails 62 and forming the bottom of a housing for the conveyor 63. A vertically spaced longitudinally extending horizontal top plate 70 is supported on the end frames 56 and 57 by longitudinally spaced, horizontal cross bars 70' and forms a cover for the housing. The two plates 69 and 70 carry longitudinally extending, vertically spaced, oppositely facing top and bottom guide channels 71 and 72 for controlling the movement of the conveyor chain 64 of the conveyor 63 and the string supporting and tensioning pins 25 which are carried thereon.

Each pin 25 (Figures 17 and 18) is secured in the enlarged end portion of a supporting shaft member 73 which is in turn rotatably mounted in a horizontal bore 74 of a U-shaped block 75. The legs of the pin supporting block 75 straddle the chain and are connected to links thereon so as to support the pin 25 and shaft member 73 for rotation about a horizontal axis. The block 75 is provided on its top and bottom faces and at opposite ends thereof with spaced guide rollers 76 which are rotatably mounted on vertically disposed supporting pins or shafts 77 and which ride in the guide channels 71 and 72. The pin supporting member 73 has a cylindrical bearing portion 78 extending through a bearing sleeve 79 mounted in the bore 74 in the block 75. On the inside of the chain the bearing portion and the sleeve 79 extend inwardly of the supporting block 75 and carry a torsion spring 80 which is secured at one end to the block 75 and at the other end to a turning arm 81 which is in turn secured to the end of the shaft portion 78 of the pin support member 73. At the front of the block 75 the pin support member 73 is provided with a radially projecting stop pin 82, the latter being adapted to rotate with the string engaging pin 25. The block 75 carries a stop pin 83 which extends into the path of the stop pin 82 and limits the rotative movement of the string engaging pin 25. The turning arm 81 is normally held in a depending vertical position (Figure 17) by operation of the torsion spring 80. The pin 25 is provided with a generally L-shaped recess 84 opening in a radial direction so as to provide on the end of the pin 25 a hook-like end formation adapted for hooked engagement with a looped end of the drawstring 20. In the initial bag receiving position (Figures 17 and 18) the recess 84 opens toward the forward or leading side of the pin 25 and the turning arm 81 is in a vertical direction for picking up the looped string from the mandrel 37 of the tying mechanism. A cam plate 85 extends along the lower guide channel 72 on the inner side of the inner run of the conveyor chain 64 for engaging the turning arm 81 and for turning the pin 25 through 90 degrees to a position which brings the recess 87 on the bottom of the pin 25, so that the hook formation opens downwardly during the various operations on the bag top. The conveyor guide members 71 and 72 are arranged so as to carry the pin 25 around the end sprocket 65 in a path which engages the hooked end thereof with a looped drawstring 20 supported on the tying mandrel 37, the movement of the latter being timed to bring it into position adjacent station A (Figure 2B) and to hold it with the ends of the looped string 20 positioned for removal from the mandrel 37 by the pins 25, 25' as they approach station A. The pin 25 is axially rotated through 90 degrees as it advances to station A by engagement of the turning arm 81 with the operating cam bar or plate 85 and simultaneously the pin is moved in the axial direction toward the side of the machine by the arrangement of the guideways 71 and 72 so as to stretch the looped string 20 between the transversely aligned pair of pins 25, 25' which receive it and to hold the same under tension as it is advanced through the machine. While the string is being stretched by outward movement of the pins 25, 25' and also turned to bring the two legs of the looped string 20 into a horizontal plane by rotation of the pins 25, 25' the bag 10 remains on the pin 25 on which it has been initially positioned at the one side of the machine. The conveyor stops with the pins 25, 25' at station A for the first operation on the bag which consists of moving the bag to a position approximately in the longitudinal center of the machine which is also the center of the looped string 20.

The mechanisms for operating on the bag top at the stations A, B, C and D are mounted on a frame 90 which is supported for vertical reciprocation on the end frames 56 and 57 (Figures 1, 2B, 7, 10, 12 and 14). The frame 90 comprises laterally spaced longitudinal side rails 91, 91' which are vertically movable in the guideway forming slots 92, 92' (Figure 7) provided in the depending legs 60, 60' of the end frame 56 and corresponding guideway forming slots 93, 93' (Figure 14) in the depending legs 61, 61' of the end frame 57 at the other end of the machine. The side plates 91, 91' of the frame 90 are vertically reciprocated by crank arm members 94, 94' and 95, 95' which are arranged in paired relation on opposite sides of the machine and which are mounted on short shafts 96, 96' and 97, 97' journaled between the pairs of side plates 62, 62 and 62', 62'. The crank arms extend generally horizontally and have their free ends connected to the side plates 91, 91' by short link members 98, 98' and 99, 99'; the latter being pivoted at opposite ends to the ends of the crank arms and the frame side plates, respectively. The crank shafts 96, 96' and 97, 97' carry depending crank arms 100, 100' and 101, 101' which are connected in paired relation by longitudinally extending equalizer rods 102, 102'. One of the shafts 96' carries a crank arm 103 (Figures 1 and 19) which has its free end pivotally connected to the upper end of a vertical link 104 with the latter having its lower end pivotally connected to the free end of an arm 105 fixed on a cross shaft 106 which is journaled between the bottom side frame members 53 and 53'. The cross shaft 106 carries a cam arm 107 at the other side of the machine which has a cam roller 108 engaging with a cam plate 109 on the drive shaft 110.

The mechanism at station A (Figures 7 to 9) for moving the bag 10 to the longitudinal center of the machine is slidably mounted on a transversely extending vertical plate or bar 111 forming the top part of a U-shaped cross frame which has its legs 112, 112' connected to the longitudinal side plates 91, 91' of the reciprocating frame 90. The bag moving or shifting mechanism comprises a gripper jaw 113 mounted in fixed depending relation on the bottom of a supporting block or carrier 114, the latter being apertured at 115 (Figure 8) to receive the frame cross bar 111 which acts as a track for the block 114. A movable L-shaped clamp member is mounted on the support block 114 with one leg 116 forming a clamping jaw in depending opposed relation to the clamping jaw 113 and with the other leg 117 horizontally disposed and bifurcated so that it straddles the block 114 and rides on bearing lugs 118 extending laterally of the bottom of the block 114. At its inner end the leg 117 is slotted at 119 to receive the ends of a cross pin 120 which is mounted on a sliding link bar 121, the latter being operative in a guideway forming recess 122 in the support block 114. The block 114 is slotted at 119' corresponding to the slots 119 in the leg 117 of the clamp member to permit movement of the cross pin relative to the block 14. The link bar 121 is pivotally connected at 123 to a depending bracket arm 124 on the end of a horizontal link 125. The link 125 is pivotally connected at its other end at 126 to a vertical operating arm 127. The arm 127 has its upper end pivotally mounted on the extended end of a tie bar 128 connecting the end frames 56 and 57. The operating arm 127 is slotted at 129 to receive a roller 130 mounted on the end of the arm 131 which is secured on the extended end of the longitudinally extending cam shaft 132, the latter being carried between the upright legs 60' and 61' of the two end frames 56 and 57. Rotation of the cam shaft 132, of course, reciprocates the support block 112 on the cross bar 111 with the slot and pin connections 119 and 120 between the bar 121 and the movable jaw 116 providing for opening of the jaws 113 and 116 when the block 114 is moved to the right (as viewed in Figure 7) and for closing the jaws when the block 114 is returned to the center of the machine by movement of the link 125, the walls of the bag 20 being gripped at the upper margin between the two jaws 113 and 116 and being carried to the center of the machine. The movement of the link 125 is timed so that it starts its reverse movement toward the side of the machine as the lift frame 90 is raised, the clamp jaws 113 and 116 being separated as the frame 90 moves up and the bag 20 is released, leaving it suspended on the string 20 which is stretched between the carrier pins 25, 25'. The clamping jaws 113 and 116 are cut out in the center as indicated at 133 in Figure 8 to clear the string 20 and the support pins 25, 25' during their movement. The bag shifting mechanism is, of course, operated in timed relation to the movement of the conveyors 63, 63' which carry the string supporting pins 25, 25' and the shifting of the bag is accomplished while the conveyors are at rest.

The bag is advanced from station A to station B by movement of the conveyors 63, 63' where the top of the bag is partially opened to permit operation of the folding fingers which fold in the top margins of the bag and provide material for the hem around the legs of the tensioned string. Bag top opening mechanism is provided at station B which is mounted on the reciprocating frame 90. The top opening or spreading mechanism (Figures 10 and 11) comprises a pair of cooperating vacuum boxes 135 and 135' each provided with openings 136 (Figure 11) in the bag engaging face thereof and each being cut away at 137 to clear the string 20 and the support pins 25, 25'. The vacuum boxes 135, 135' are carried in depending relation on a pair of carriage forming blocks 138 and 138' which are provided with guideway forming apertures 139, 139' for receiving the cross bar 140 of an upstanding inverted U-shaped frame having its legs 141 and 141' attached at the lower ends to the side plates 91 and 91' of the reciprocating frame 90. The carriages 138 and 138' are connected by links 142 and 142' to the lower ends of a pair of depending arms 143 and 143', the latter being rotatably mounted at their upper ends on the tie rods 144 and 145 which extend between the top cross bars 58 and 59 of the end frames 56 and 57. The depending arms 143, 143' each form one arm of a bell crank, the other arms 146 and 146' extending toward each other and being provided with cooperating gear segments 147 and 147' to effect simultaneous operation of both of the arms 143 and 143'. The one arm 146' is connected with a depending arm or operating lever 148 which has its free end pivotally connected to one end of a link 149 which has its other end pivoted at 150 to a cam arm 151, the latter being pivoted on a frame tie bar 152 and carrying on its end a cam roller 153 which engages with a cam plate 154 on the longitudinal cam shaft 132. The suction boxes 135 and 135' are, of course, initially separated when the frame 90 is in the uppermost position. When the bag is moved to the station B and the frame 90 is lowered the suction boxes 135 and 135' are moved into position on opposite sides of the bag 10, the latter being located at the longitudinal center of the machine. Thereafter the suction boxes 135 and 135' are moved toward each other by reciprocation of the carriers 138, 138' and suction is applied to the outside faces of the opposite walls of the closed bag top. The suction boxes 138 and 138' are then moved apart by operation of the cam 154 to spread the bag top as indicated in dotted line on Figure 10, the bag being supported on the string 20 which is tensioned between the two carrier pins 25, 25'. Separating movement of the suction boxes 138 and 138' opens the bag top and as the suction is cut off the frame 90 moves upwardly carrying the suction boxes 138 and 138' above the bag top and permitting movement of the bag in its opened up condition to the next operating station C.

The marginal portions 17 of the opened up bag top are folded in over the two legs of the string 20 at station C to form the string encasing hem 18. The mechanism for folding in the bag top margins comprises a pair of folding or tucking fingers 155, 155' (Figures 12 and 13) which are in the form of elongate pins supported by means of angle brackets 156, 156' in depending relation from a pair of transversely reciprocating carriage forming blocks 157, 157', the latter being apertured at 158, 158' to receive the track forming cross bar 160 of a transversely extending inverted U-shaped support frame which has its legs 161 and 161' secured to the side plates 91, 91' of the vertically reciprocating frame 90. The carriages 157 and 157' are pivotally connected to the ends of links 162, 162' which are pivotally connected at their other ends to the bottom ends of a pair of depending arms 163 and 163' which have their upper ends pivotally mounted on the frame tie bars 144 and 145 and which are connected for simultaneous movement by the arms 164, 164', the latter having on their free ends interengaging gear segments 165 and 165'. The one arm 164' is connected with a depending arm 166 which is pivotally connected at its free end to one end of the link 167, the latter having its other end pivoted at 168 to a cam arm 170 which is pivoted on the tie bar 152 and has a cam roller 171 engaging with a cam plate 172 on the longitudinal cam shaft 132. In operation the movement of the folding or tucking fingers 155 and 155' is timed so that they are initially separated while the frame 90 is raised which positions the fingers outside the walls of the bag 10 and above the string 20. The cam 172 then operates to move the fingers 155 and 155' toward each other until they are positioned inside the opened bag top, the marginal portions of the bag material being folded in over the string 20 by this movement of the fingers. The fingers are then lowered into the bag by descending movement of the frame 90 carrying the marginal portions of the bag walls downwardly between the legs of the string 20 and forming a hem which encases the two legs of the string, leaving the looped ends extending through the apertures 16 and 16' which are at the fold line. The fingers are moved apart somewhat by operation of the cam 172 to insure complete folding of the hem forming material before the frame 90 is elevated, which withdraws the fingers from the bag and leaves the same suspended on the string 20 for advance to the next station D.

At station D the inturned or folded hem material is provided with the heat sealed seam 18, the latter being spaced inwardly of the string 20 so that the string is encased in the hem. The seam forming mechanism is carried on the cross bar 175 of an inverted U-shaped frame which has its legs 176 and 176' secured to the side bars 91, 91' of the reciprocating frame 90. The mechanism comprises a pair of anvil plates 177 and 177' which depend from the carriage forming blocks 178 and 178', the latter having guideway forming apertures 180 and 180' which receive the track forming cross bar 175 so that the anvil plates are movable on the frame cross bar 175 toward and from each other. The anvil supporting carriages 178, 178' are urged towards each other by a tension spring 181 which is connected between them. They are moved apart or spread by identical mechanisms which are operated upon downward movement of the reciprocating frame 90. The operating mechanism for carriage 178 comprises a bell crank member 182 which is pivotally mounted at 183 on an upstanding bracket 184 on the frame bar 175 and which has its depending leg 185 connected by a link 186 to the carriage 178. The other leg or arm 187 of the bell crank is provided with an adjustable screw 188 which is adapted to engage or strike an upstanding pin 190 mounted on the top plate 70 of the housing for conveyor 63. The screw 188 is adjusted so that the bell crank is operated by descending movement of the frame 90 to move the anvil plate 177 toward the side of the machine. A corresponding operating mechanism, indicated by the same numerals primed, moves the carriage 178' and the anvil plate 177' towards the other side of the machine so that the bag mouth is stretched against the anvil plates. The anvil plates are preferably a heat resistant material, for example, Teflon. The sealing of the bag material is effected by a pair of cooperating sealing irons 191 and 191' which are mounted in opposed relation between the lower ends of the depending legs 192 and 192' of a pair of inverted U-shaped carrying frames 193 and 193'. The frames 193 and 193' each have a pair of pivot brackets 194 and 194' at the upper outer corners which extend inwardly toward each other, with the brackets at each corner mounted on pivot pins 195 and 195'. The pivot pins 195 and 195' are carried on bracket members 196 and 196' upstanding from the top cross bar 175 of the supporting frame. The frames 193 and 193' have top cross bars 197 and 197' which carry upstanding operating arms 198 and 198' having at their upper ends cam plates 200 and 200'. The cam plates 200 and 200' have downwardly and outwardly tapered edges 201 and 201' in oppositely facing relation and positioned to engage with a cam roller 202 on the lower end of a vertically slidable operating member 203. The vertical slide member 203 is mounted in sliding relation in a guideway formation 204 provided in the vertical stem portion of a T-shaped bracket 205 which is mounted between tie rods 144 and 145. The slide member 203 is reciprocated by an arm 206 which is pivotally mounted on the shaft 145 and having a forked end 207 straddling a roller 208 mounted on the upper end of the slide member 203. The arm 206 is connected to a depending arm 210 on the rod 145 which has its lower end connected by a link bar 211 with a cam arm 212 carried on the rod 152. The cam arm 212 carries a cam roller 213 which engages with a cam plate 214 on the cam shaft 132. The cam plate 214 operates to reciprocate the slide member 203 in proper timed relation to the movement of the frame 90 for pivoting the heat sealing jaws 191 and 191' toward each other for effecting the heat sealing of the hem 19.

After the bag top has been operated on at station D and the seam forming mecahnism has been retracted by upward movement of the frame 90, the conveyors 63, 63' advance the bag, which is now completed, beyond the station D for discharge from the machine. The guide channels 71, 72 and 71', 72' on the conveyors 63 and 63' are curved inwardly as indicated at 215 and 215' in Figure 2B to move the pins 25, 25' toward each other and release the string 20 from the same so that the completed bag is free to fall onto the top run of a discharge conveyor as indicated at 216.

While the bag is traveling from stations A to D it is suspended on the string 20 carried by the pins 25 and 25' between the conveyors 63 and 63' with substantial portions of the bag body depending below the supporting string, which depending portions, in the case of a bag of large size, are in flattened, unopened condition. In order to avoid damage to the bag, mechanism is provided for holding and guiding the depending bottom portion of the bag as it advances from station to station. This mechanism comprises a vacuum box 220 (Figures 2B, 3 and 16) and an endless chain 221 which is mounted thereon. The vacuum box 220 is supported on the machine for vertical adjustment to accommodate bags of different lengths by two longitudinally spaced angle brackets 222 which are secured on the box 220 and provided with clamping bolts 223 which are slidable in the slots 224 in vertical support plates 225, the latter being secured on the frame of the machine between the bottom side rail 55' and the inside top side rail 62' (Figure 3). The inside vertical face 226 of the box 220 is apertured at 227 behind the one run of the chain 221. The chain 221 (Figure 16) is carried by end sprockets 228 and 228' mounted on a pair of vertical shafts 230 and 230' which are supported at opposite ends of the box 220 by longitudinally extending pairs of bracket plates 231 and 231' having suitable vertical bearings for the same. The one shaft 230 is provided with a sprocket 232 which is connected by the drive chain 233 (Figures 2B and 3) with a sprocket 234 on the drive shaft 68' for the conveyor 63'. The suction box 220 is connected with a suitable vacuum pump 235 which is mounted on the side of the machine by means of the bracket formation 236.

The various operating mechanisms are driven from a common source of power. A stub shaft 240 (Figures 1, 4 and 5) is journaled in the one base member 50 and extended at one side of the machine to receive a pulley 241 connected by a drive belt 242 with the power pulley 243 on a combination motor and reduction unit 244 which is supported by means of a suitable motor mount 245 at the base of the string applying portion of the machine. The shaft 240 carries a pinion 246 adjacent the pulley 241 which is in driving relation with the gear 247 on a cross shaft 248. The shaft 248 is connected in driving relation with a cross shaft 250 by the pinion 251 on the shaft 248 adjacent the base member 50' at the other side of the machine and the gear 252 on the shaft 250, the latter being journaled in the base members 50 and 50'. The shaft 248 is also connected in driving relation with the cross shaft 110 by a pinion 253 on the shaft 248 which engages with a gear 254 on a cross shaft 110. The shaft 110 carries outside the base member 50' the continuously rotating drive member 256 of a Geneva drive, the intermittently driven member 257 being carried on a cross shaft 258, also journaled in the base members 50 and 50'. The cross shaft 258 carries a sprocket 260 which is connected by the chain 261 to a sprocket 262 on the cross shaft 263 which is journaled in depending bearing brackets 264 and 264' (Figure 3) on the frame cross member 54 at the discharge end of the machine. The cross shaft 263 carries at opposite ends bevel gears 265 and 265' which engage with cooperating bevel gears 266 and 266' on the vertical drive shafts 68 and 68' for the conveyors 63 and 63', so that the latter are operated intermittently by the Geneva drive 256 and 257. The cross shaft 250 carries on the end thereof at the back side of the machine the continuously rotating drive member 267 of a Geneva drive, the intermittently driven member 268 being carried on the end of a cross shaft 270 which is journaled in the base members 50 and 50'. The cross shaft 270 carries a sprocket 271 which is connected by the drive chain 272 with a sprocket 273 on the end of a short cross shaft 274. The cross shaft 274 is journaled in suitable bearing members (not shown) depending from a frame cross member 54 at the end of the machine adjoining the loop forming mechanism 26 and carries a bevel gear 275 which engages with a cooperating bevel gear 276 on the bottom end of the vertical drive shaft 36 which operates the mandrel conveyor 32 of the loop forming mechanism 26, so that the latter is intermittently driven by the Geneva drive 267 and 268 in timed relation to the movement of the conveyors 63 and 63'. The cross shaft 248 carries a sprocket 277 which is connected by a chain 278 with a sprocket 280 on a cross shaft 281 which is journaled in the base members 50 and 50'. The cross shaft 281 carries on its end a bevel gear 282 which engages with a cooperating bevel gear 283 on the end of a longitudinally extending drive shaft 284. The shaft 284 is journaled in suitable bearings mounted in the bottom end of the vertical frame plate 61' and a bracket 285 extending from the side frame plate 53'. The shaft 284 carries a sprocket 286 which is connected by a drive chain 287 with a sprocket 288 on the extended end of the cam shaft 132 which is supported on the upper frame structure so that the cam shaft 132 is driven continuously.

In operating the machine, the bag sections 10, in flattened condition and with the apertures 16, 16' aligned, are placed on the pins 25 of the conveyor 63, either manually or by means of an automatic feed (not shown). Each successive bag section 10 is carried by advancing movement of its supporting pin 25 around the end sprocket 65 to the first work station A. A drawstring in the form of a looped and tied length of drawstring material is formed on each of the mandrels 37 which are carried on the conveyor 32 of the drawstring forming mechanism 26 and the mandrels are advanced by intermittent operation of the conveyor 32 in timed relation to the operation of the conveyors 63 and 63' so as to position a mandrel 37 with a looped string thereon between the end sprockets 65 and 65' for removal of the looped string by passage of a pair of string supporting pins 25 and 25' through the recesses 41 at the ends of the mandrel 37. The pins 25 and 25' are initially positioned so that the string receiving recesses 84 and 84' open in the direction of advancing movement of the pins so as to pick the string 20 from the mandrel 37 by engaging the looped ends thereof in the recesses. As the pins 25 and 25' advance to work station A the cam plates 81 and 81' are engaged by the rails 85 and 85' to rotate the pins about their axis through 90° and position the string receiving recesses 84 and 84' so that they open downwardly. The pins 25 and 25' are also moved apart as they advance toward the work station A due to the spacing of the track members 71, 72 and 71', 72', which are spaced a greater distance apart at the work stations than at the end supporting sprockets. The separating movement of the chains which carry the string supporting pins 25 and 25' in the guideways formed by the track members 71, 72 and 71', 72' stretches the string 20 between the pins. The turning movement of the pins between the pick up of the string from the mandrel 37 and work station A permits an improperly positioned string to be dropped as it moves between the pick up point and station A.

The successive mechanism for operating on the top of the bag section at the work stations A, B, C and D are all mounted on the reciprocating frame 90 and the latter is reciprocated in timed relation to the movement of the work carrying pins 25 and 25' from one station to the next, so that each operation is performed on each successive bag while the succeeding operations are performed on the bags which preceded it.

At station A, while the frame 90 is elevated, the carriage 114 is moved to the right in Figure 7 and the jaws 113 and 116 are opened. As the pin 25 carrying the bag section 10 moves into position at the station, the frame 90 descends placing the open jaws 113 and 116 on opposite sides of the mouth of the bag section and thereafter the carriage 114 moves to the left which closes the jaws 113 and 116 on the top of the bag section and moves it to the center of the string 20 as indicated in dotted line. The jaws 113 and 116 are immediately opened by a slight reverse movement of the operating bar 125 freeing the bag 10 so that it remains in the center of the string when the frame 90 is moved upwardly and the pins 25, 25' move onto the next station B.

At work station B the vacuum boxes 135 and 135' are initially in open position while the frame 90 is elevated. When the bag 10 is carried by the pins 25, 25' to the station and the frame 90 descends the vacuum boxes 135 and 135' are moved toward each other and vacuum is applied to grip the side walls of the bag material. Thereafter the carriages 138 and 138' are moved outwardly to the dotted line position indicated in Figure 10 and the vacuum is cut off to leave the bag top in spread open condition after which the frame 90 rises and the bag is freed for movement to the next work station.

At work station C the carriages 157 and 157' are moved apart while the frame 90 is elevated so that the folder fingers 155 and 155' are outside of the walls of the bag when the bag top is moved into position at the station. The carriages 157 and 157' are then moved toward each other and the folder fingers 155 and 155' strike the top edges of the bag walls and move the same inwardly so that when the frame 90 descends the pins 155 and 155' will move down between the two legs of the looped string 20 and fold the marginal portions of the bag walls over the two legs of the string, moving them into the position indicated in Figure 12. Elevation of the frame 90 then withdraws the folding fingers 155 and 155' and frees the bag for movement to the next station.

At station D the sealing bars 191 and 191' are swung to the open position when the frame 90 is elevated and the anvil plates 177 and 177' are moved by the spring 181 toward each other. When the frame 90 descends the anvil plates 177 and 177' move into the top of the bag between the two legs of the string and as the frame 90 reaches the bottom limit of its movement the plates 177 and 177' are separated sufficiently to stretch the bag top. Thereafter the sealing irons 191 and 191' are swung to the operative position and form the seal in the hem formation in the bag top against the anvil plates 177 and 177'. The sealing irons 191 and 191' are then swung to the open position and the frame 90 moves upwardly allowing the anvil plates 177 and 177' to be moved by the spring 181 toward each other and then moved upwardly out of the bag, thus freeing the bag and completing the operations on the same.

As the bag is advanced beyond station D, the string carrying pins 25 and 25' are moved towards each other by the spacing of the guide channels and rotated through 90°, the cam arms 81, 81' being freed by dropping off of the ends of the cam rails 85 and 85'. The string 20 is released by movement of the pins 25 and 25' and allowed to drop out of the recesses 84 and 84' so that the completed bag is deposited by gravity onto the delivery conveyor 216.

While particular materials and specific details of construction have been referred to in describing the method and machine herein illustrated, it will be understood that other materials and equivalent details of construction may be resorted to within the spirit of the invention.

I claim:

1. A method of providing a bag section of flexible material with a draw string closure in one end thereof which comprises supporting a tubular section of bag forming material having aligned apertures adjacent the margins of flattened wall portions thereof on one of a pair of traveling pins by passing the pin through the aligned apertures, supporting the pins for movement in oppositely disposed relation along a predetermined path, engaging the pair of pins with a drawstring in the form of a closed loop so that the looped string is stretched between the pins as the pins advance along the path, moving the bag section onto the looped string, opening up and reforming the end of the tubular section to bring end wall portions into oppositely disposed relation, folding the end margins of the tubular section inwardly between and over the portions of the drawstring which extend between the apertures and securing said infolded margins to adjoining portions of the walls of the tubular section inwardly of the drawstring to form a hem which encases the drawstring with the looped end portions of the drawstring extending through the apertures and releasing the string from the traveling pins at the end of said path.

2. A method of providing a flexible bag with a drawstring closure in one end thereof which comprises supporting a bag forming tubular section having aligned apertures adjacent the margins of flattened wall portions on one of a pair of traveling pins by passing the pin through the aligned apertures, supporting the pins for movement in oppositely disposed relation along a predetermined path, engaging the pair of pins with a drawstring in the form of a closed loop so that the looped string is stretched between the pins, advancing the pins to successive work stations, moving the bag section onto the looped string at the first work station, expanding and reforming the end of the tubular section to bring opposite end wall portions into oppositely disposed relation at the second work station, folding the end margins of the tubular section inwardly between and over the portions of the drawstring which extend between the apertures at the third work station and securing said infolded margins to the inner surface of the walls of the tubular section inwardly of the drawstring to form a hem which encases the drawstring with looped end portions of the drawstring extending through the apertures at the fourth work station and thereafter releasing the string from the traveling pins.

3. A method of providing a bag which is formed of heat sealable film material with a drawstring closure in one end thereof which comprises supporting a flattened tubular bag section having aligned apertures adjacent the margins of the mouth forming end on one of a pair of oppositely disposed pins by passing the pin through the aligned apertures, engaging the pair of pins with a drawstring in the form of a closed loop so that the looped string is stretched between the pins, moving the bag section onto the looped string, opening the end of the tubular section to bring end wall portions into oppositely disposed spaced relation, folding said end margins inwardly between and over the portions of the drawstring which extend between the apertures, heat sealing said infolded margins to the inner surface of the adjacent portions of the walls of the tubular section inwardly of the drawstring to form a hem and encase portions of the drawstring with the looped end portions of the drawstring extending through the apertures and releasing the string from the pins.

4. A method of forming a drawstring closure in the end of a flattened tubular bag section which is provided with aligned apertures adjacent the mouth forming end in opposed side wall portions thereof, which comprises supporting the bag section on a traveling member which has an end portion adapted to extend through said apertures, engaging a drawstring in looped formation with the end portion of the traveling member and stretching the string to form it into an elongate loop extending from said member, moving the bag section onto the string so that the ends of the loop extend through said apertures, opening up the mouth of the tubular section and bringing opposite end wall portions into opposed relation, folding the end marginal portions of the tubular section inwardly and downwardly between oppositely disposed portions of the looped drawstring with the drawstring being used as a former, forming a seal to secure the edges of the infolded portions of the bag material to the walls of the tubular section and to enclose the drawstring portions in the resulting hem and thereafter releasing the ends of the looped drawstring.

5. A method of forming a drawstring closure in the end of a flattened tubular bag section which is provided with aligned apertures adjacent the mouth forming end in opposed side wall portions thereof, which comprises supporting the bag section on a member which has an end portion adapted to extend through said apertures, engaging one end of a drawstring in looped formation with the end portion of the member and stretching the string to form it into an elongate loop, moving the bag section off the member and onto the string so that the ends of the loop extend through said apertures, opening up the mouth of the tubular section and bringing opposite end wall portions into partially closed relation extending along the looped string, folding the marginal portions of the tubular section inwardly and downwardly between oppositely disposed portions of the looped drawstring with the drawstring being used as a former, and securing the end edges of said infolded portions to the inner faces of the adjoining wall portions whereby to enclose the stretched portions of the looped string in the resulting hem and releasing the looped ends of the string.

6. A method of forming a drawstring closure in the end of a flattened tubular bag section which is provided with aligned apertures adjacent the mouth forming end in opposed side wall portions thereof which method comprises supporting the tubular section on a carrying member having a hook formation which is passed through the apertures in the flattened bag section, engaging one end of a drawstring in looped formation with the hook formation and supporting the other end of the drawstring so that it has spaced leg forming sections in stretched condition, moving the bag section onto the stretched leg sections of the string, expanding the mouth of the bag section while it is on the drawstring and bringing opposite end wall portions into opposed relation, folding the marginal portions of the mouth end of the bag section inwardly between the leg forming sections of the looped drawstring and securing the edges of the infolded portions to the adjoining wall portions to enclose the leg portions of the drawstring in the hem which is formed thereby.

7. A method of forming a drawstring closure in the end of a bag forming section of flattened tubular heat sealable film material which is provided with aligned apertures adjacent the mouth end in opposed side wall portions thereof which method comprises supporting a bag section on one of a pair of carrying members each having a hooked end formation by passing the hooked end thereof through the apertures in the bag section, engaging opposite ends of a string in looped formation with the hooked end formations and moving the carrying members away from each other to stretch the string and provide spaced leg forming sections in taut condition, moving the bag section onto the leg sections of the string, opening up the mouth of the bag section while it is suspended on the string and bringing wall portions at the mouth end into opposed relation along the leg sections of the string, folding the marginal wall portions at the mouth end of the bag section inwardly between the leg forming sections of the looped string and heat sealing the edges of the infolded marginal portions of the bag section to adjoining wall portions thereby enclosing the leg portions of the string in the hem which is formed thereby.

8. A method of forming a drawstring closure in the end of a bag forming section of flattened tubular material having heat sealing characteristics which bag section is provided with aligned apertures adjacent the mouth forming end in opposed side wall portions thereof which method comprises supporting the bag section on one of a pair of carrying members having hook-like end formations, one of which is adapted to be passed through the apertures in the bag section to initially support the same, forming a string into a closed loop and engaging the looped string formation with the hook-like end formations on the carrying members, moving the members away from each other to stretch the string so that it has spaced leg forming sections in generally parallel relation, advancing the carrying members to sucessive operating stations, moving the bag section onto the stretched leg sections of the string, reforming the mouth of the bag section while it is on the string to bring the wall portions between the apertures into opposed relation outside of the leg sections of the string, folding the marginal portions of the mouth end of the bag section inwardly and downwardly between the leg sections of the looped string and securing by a heat sealed seam the edges of the infolded marginal mouth portions of the bag section to adjoining wall portions thereby to enclose the leg portions of the string in the hem which is formed thereby.

9. A method of forming a hem and enclosing a drawstring in a flattened tubular bag section which is provided with a pair of apertures in aligned relation in oppsitely disposed portions of the margin of the bag section at the mouth forming end thereof which method comprises positioning the bag section on a pin member which is of a size to extend through the apertures, engaging a drawstring which is in the form of a closed loop with the pin member and stretching the same outwardly in axially extending relation from the pin so that portions of the loop are in generally parallel spaced relation, moving the bag section onto the string so that it is positioned intermediate the looped ends thereof, opening up the mouth of the bag section while it is suspended on the string, folding the marginal portions of the bag mouth inwardly over the spaced portions of the string, and securing the infolded marginal portions to adjoining portions of the bag walls so as to provide a marginal hem which encloses the string with the looped end portions thereof extending through the apertures therein.

10. Apparatus for forming a drawstring closure in the end of a flattened tubular bag section which is provided with aligned apertures adjacent the mouth forming end in opposed side wall portions thereof, said apparatus comprising a pair of spaced endless conveyors arranged for operation with opposed runs thereof traveling in parallel relation on opposite sides of a predetermined path, string supporting members carried on said conveyors in paired relation for engaging a looped string at opposite ends and for advancing the looped string along said path, one of each pair of said string supporting members being adapted to carry a bag section, means adjacent said conveyors for supplying successive looped strings to the string supporting members, one means at successive work stations adjacent said conveyors for moving each successive bag section onto a looped string suspended between a pair of said string supporting members so that the string extends through the apertures in the side walls thereof, for opening up the mouth of the bag section, for folding marginal portions of the bag mouth inwardly over the string and for securing asid inwardly folded portions to the inner walls of the bag section to encase the string in the hem formed thereby with opposite looped ends of the string extending through the apertures at the fold line.

11. Apparatus for forming a drawstring closure in the mouth forming end of a flattened tubular bag section of heat sealable material which is provided with aligned apertures in opposed side wall portions thereof, said apparatus comprising a pair of spaced endless conveyors arranged for operation with opposed runs thereof traveling in a common plane and in parallel relation on opposite sides of a predetermined path, string supporting members carried on said conveyors in paired relation for engaging a looped string at opposite ends and for advancing the looped string along said path, one of each pair of said string supporting members being adapted to carry a bag section, means at one end of said conveyors for supplying successive looped strings to the string supporting members, and means at successive work stations adjacent said conveyors for moving each successive bag section onto a looped string extending between a pair of said string supporting members so that the string extends through the apertures in the side walls thereof, for opening up the mouth of the bag section, for folding marginal portions of the bag mouth inwardly over the string and for forming a heat seal in said inwardly folded portions to secure the same to the inner walls of the bag section and to encase the string in the hem formed thereby with opposite looped ends of the string extending through the apertures at the fold line.

12. Means for providing a flexible bag with a drawstring closure in one end thereof comprising a pair of conveyors, string supporting members mounted on said conveyors so as to travel in oppositely disposed paired relation along a predetermined path, means adjacent said conveyors to supply successive pairs of said string supporting members with a closed loop of drawstring forming material so that the looped material extends in stretched relation between the supporting members, one of said supporting members being formed to receive a flattened tubular bag section and having a string engaging portion adapted to extend through aligned apertures provided in the marginal portions of the mouth forming end of the bag section, means adjacent said conveyors to grasp a bag section on one of said supporting members and move said bag section onto the looped string, means along said path to open up the mouth of the bag section while it is supported on the string, means along said path to fold inwardly the marginal portions of the mouth end of the bag section over the stretched portions of the string material, and means along said path for securing the infolded marginal portions to adjoining portions of the walls of the bag section thereby forming a marginal hem which encases portions of the string material with the looped ends of the latter extending through the apertures in the bag section.

13. Means for providing a flexible bag with a drawstring closure in one end thereof comprising a pair of endless chain conveyors, string supporting members mounted on said conveyors so as to travel in oppositely disposed paired relation in a common plane and along a predetermined path, means to supply successive pairs of said string supporting members with a closed loop of drawstring forming material so that the looped material extends between the supporting members, one of said supporting members being formed to receive a flattened tubular bag section and having a string engaging portion adapted to extend through aligned apertures provided in the marginal portions of the mouth forming end of the bag section, means adjacent the conveyors to move the bag section onto the looped string, means adjacent the conveyors to open up the mouth of the bag section while it is supported on the string, means adjacent the conveyors to fold inwardly the marginal portions of the mouth end of the bag section over the stretched portions of the string, and means adjacent the conveyors for securing the infolded marginal portions to adjoining portions of the walls of the bag section thereby forming a marginal hem which encases portions of the string with the looped ends of the latter extending through the apertures in the bag section.

14. Means for providing a flexible bag with a drawstring closure in one end thereof comprising a supporting frame, a pair of endless conveyors mounted on said frame in laterally spaced relation and having string supporting members arranged thereon to extend toward each other in spaced paired relation along opposed runs of the conveyors, means to operate said conveyors intermittently, means to supply successive pairs of said string supporting members with a closed loop of drawstring forming material so that the looped material extends between the supporting members, means to guide the string supporting members to space them from each other sufficiently to stretch the string while it is advanced between said conveyors, one of said supporting members being formed to receive a flattened tubular bag section and having a string engaging portion adapted to extend through aligned apertures provided in the marginal portions of the mouth forming end of the bag section, a vertically reciprocating sub-frame on said supporting frame, means on said sub-frame operable to engage the bag section and move the same onto the looped string, means on said sub-frame to open up the mouth of the bag section while it is supported on the string, means on said sub-frame to fold inwardly the marginal portions of the bag section over the stretched portions of the string, means on said sub-frame for securing the infolded marginal portions to adjoining portions of the walls of the bag section thereby forming a marginal hem which encases portions of the string with the looped ends of the latter extending through the apertures in the bag section, and means to reciprocate said sub-frame in timed relation to the movement of said conveyors.

15. Apparatus for forming a hem in the mouth forming end of a tubular bag section and enclosing a drawstring therein comprising a pair of string supporting members arranged in spaced relation, one of said members having a pin-like string engaging portion on which a flattened bag section is initially supported, the bag section having oppositely disposed apertures in the margin of the mouth forming end thereof through which the pin-like portion is passed, means cooperating with the string supporting members to supply a length of string in a closed loop of elongate form and to engage the looped ends thereof with said string supporting members so that the string is extended between said string supporting members with the portions intermediate the looped ends in generally parallel spaced relation, means associated with said string supporting members for moving the bag section over said pin-like portion and onto the string, means associated with said string supporting members for opening up the mouth of the bag section while it is supported on the string, means associated with said string supporting members for folding the margins of the mouth of the bag section inwardly against adjacent portions of the bag walls and for securing the same thereto so as to form a hem which encases portions of the string with the looped ends thereof extending through the apertures in the hem.

16. In apparatus for forming a hem in the mouth end of a tubular bag section and enclosing a drawstring therein which comprises a supporting frame, a pair of endless conveyors mounted on longitudinally spaced end sprockets arranged so that opposed runs operate in a horizontal plane in oppositely disposed parallel relation, string supporting members arranged in spaced relation on said conveyors so that they are disposed in aligned pairs when traversing said opposed runs thereof, each of said string supporting members having a pin-like string engaging end portion on which a flattened bag section may be initially supported, the bag section having oppositely disposed apertures in the margin of the mouth forming end thereof through which the pin-like portion is passed, a string looping and tying mechanism comprising a horizontal mandrel carrying conveyor, mandrels on said conveyor and means for looping and tying a string on each successive mandrel, said mandrel carrying conveyor being positioned to move successive mandrels into the paths of said string supporting members so as to position the looped ends of a string thereon for engagement by the string engaging end portions of said string supporting members thereby to remove the string from the mandrel and position it in extended relation between said string supporting members.

17. In apparatus as recited in claim 16 and said string mandrels comprising a base portion secured to said mandrel carrying conveyor, and a string supporting frame having notched ends to accommodate passage of the end portions of said string supporting members.

18. In a machine for forming a hem in the end of a tubular bag section and encasing a looped drawstring therein, an upright supporting frame, a pair of elongate endless chain conveyors mounted on end sprockets which are supported on spaced vertical axes on said frame so that opposed runs of the conveyors travel on opposite sides of a predetermined path, each of said conveyors having mounted thereon a series of pin members extending outwardly thereof and having hook-like end formations, said pins being spaced on said conveyors to move along said path in oppositely disposed paired relation, means for forming a length of string into an elongate closed loop and for moving the same into position where the ends of the loop are engaged by a pair of said pins as said pins advance along said path, one of said pins being adapted to carry a tubular bag section which has oppositely disposed apertures in the margin at the mouth forming end, the hook-like formation on the pin being adapted to extend through the apertures in the bag margin, and means on said frame at successive work stations along said path to grasp a bag section positioned on said pin and move the same onto the string, to open up the mouth of the bag section while it is suspended on the string, to fold the marginal portion of the bag mouth around the string and against adjacent portions of the bag walls and to secure the folded marginal portion to the bag walls thereby forming a hem with the string encased therein.

19. In a machine for forming a hem in the end of a tubular bag section and encasing a looped drawstring therein, an upright supporting frame, a pair of elongate endless chain conveyors mounted on end sprockets supported on spaced vertical axes on said frame so that opposed runs of the conveyors travel in a horizontal plane on opposite sides of a predetermined path, each of said conveyors having mounted thereon a series of string carrying pins, each of said pins projecting laterally outwardly of its respective conveyor, each of said pins having hook-like end formations and said pins being spaced on said conveyors to move along said path in oppositely disposed paired relation, means for forming a length of string into an elongate closed loop and for delivering the looped string to a pair of carrying pins comprising a horizontal conveyor arranged on said supporting frame with its leading end adjacent the ends of said pin carrying conveyors, a series of mandrels on said horizontal conveyor, means to form a section of string into a closed loop on each of said mandrels, said mandrels having recessed ends, said horizontal conveyor being arranged to move successive mandrels into position relative to the pin carrying conveyors where the ends of the loop are engaged by a pair of said pins as said pins advance along their path between the ends of the pin carrying conveyors.

20. In a machine for forming a hem in the end of a tubular bag section and encasing a looped drawstring therein, a supporting frame, a pair of elongate endless chain conveyors mounted on end sprockets supported on spaced vertical axes on said frame so that opposed runs of the conveyors travel in a horizontal plane on opposite sides of a predetermined path, each of said conveyors having mounted thereon a series of outwardly projecting pins having radially opening string receiving recesses providing hook-like end formations and said pins being spaced on said conveyors to move along said path in oppositely disposed paired relation, means on said supporting frame for forming a length of string into an elongate closed loop and for positioning the same where the ends of the loop are engaged in the recesses in a pair of said pins as said pins advance along said path, one of said pins being adapted to carry a tubular bag section which has oppositely disposed apertures in the margin at the mouth forming end, the hook-like formation on the pin being adapted to extend through the apertures in the bag margin, said pins being mounted on said conveyors for rotation about their axes and means on said frame along said path to axially rotate said pins.

21. Apparatus for forming a drawstring closure in the end of a flattened tubular bag section which is provided with aligned apertures adjacent the mouth forming end in opposed side wall portions thereof, said appartus comprising a pair of laterally spaced endless conveyors arranged for operation in a horizontal plane with opposed runs thereof traveling in parallel relation and in the same direction on opposite sides of a predetermined path, string supporting members carried on said conveyors in paired relation for engaging a looped string at opposite ends and for advancing the looped string along said path to successive work stations, means adjacent the receiving end of said conveyors for supplying successive looped strings to the string supporting members, one of each pair of said string supporting members being adapted to carry a bag section, a vertically reciprocating frame, and means carried on said reciprocating frame for operating on a bag section at each of said work stations including means for grasping the bag section and moving it onto a looped string carried on said string supporting members so that the string extends through the apertures in the side walls of the bag section, means for opening up the mouth of the bag section, means for folding marginal portions of the bag mouth inwardly over the string and means for sealing said inwardly folded portions to the walls of the bag section to encase the string in a hem formation with opposite looped ends of the string extending through the apertures at the fold line, and drive means for operating the conveyors, and the reciprocating frame in timed relation to advance the bag section to the successive work stations for operation thereon by said means.

22. Apparatus for forming a drawstring closure in the end of a flattened tubular bag section which is provided with aligned apertures adjacent the mouth forming end in opposed side wall portions thereof, said appartus comprising a pair of laterally spaced endless conveyors arranged for operation in a horizontal plane with opposed runs thereof traveling in parallel relation and in the same direction on opposite sides of a predetermined path, string supporting members carried on said conveyors in paired relation for engaging a looped string at opposite ends and for advancing the looped string along said path to successive work stations, means adjacent said conveyors for supplying successive looped strings to the string supporting members, one of each pair of said string supporting members being adapted to receive a bag section, a vertically reciprocating frame, means carried on said reciprocating frame at the first work station for moving a bag section carried on a string supporting member onto a looped string suspended between a pair of said string supporting members so that the string extends through the apertures in the side walls thereof, means carried on said reciprocating frame at the next work station for opening up the mouth of the bag section, means carried on said reciprocating frame at the next work station for folding marginal portions of the bag mouth inwardly over the string and means carried on said reciprocating frame at the next work station for sealing said inwardly folded portions to adjacent portions of the walls of the bag section thereby to encase the string in a guideway forming hem with opposite looped ends of the string extending through the apertures at the edge of the mouth of the bag.

23. In a machine for forming a drawstring closure in the end of a flattened tubular section, mechanism for supporting and conveying a looped string comprising an endless chain mounted on spaced end sprockets, and a series of string engaging and carrying devices carried in spaced relation on said chain, each of said string engaging devices comprising a mounting block secured on the chain, said mounting block having a bore extending transversely of the line of travel of the chain, a bearing sleeve in said bore, a cylindrical pin member having one end of reduced section forming a shaft portion rotatably mounted in said sleeve, the other end of said pin extending outwardly of the path of travel of the chain and having a radial recess adjacent the end for receiving the looped string, the shaft end of said pin extending beyond said bearing sleeve and having a radially extending cam arm thereon for rotating the pin about its axis in the bearing sleeve, a torsion spring between the mounting block and the pin urging the pin about its axis in a predetermined direction and interengaging stop members on the mounting block and the pin for limiting the rotation of the pin about its axis.

24. In a machine for forming a drawstring closure in the end of a flattened tubular bag section, mechanism for supporting a looped string and for advancing the same along a predetermined path comprising a conveyor mounted on spaced end supports, a series of string engaging and carrying devices carried in spaced relation on said conveyor, each of said string engaging devices comprising a mounting member secured on the conveyor, said mounting member having a bore extending transversely of the line of travel of the conveyor, a cylindrical pin member having one end forming a shaft portion rotatably mounted in said bore, the other end of said pin extending outwardly of the path of travel of the conveyor and having a recess adjacent the end for receiving the looped string, the shaft end of said pin extending beyond said bore and having a radially extending cam arm thereon for rotating the pin about its longitudinal axis, a spring between the mounting member and the pin for urging the pin about its axis in a predetermined direction and interengaging stop members on the mounting member and the pin for limiting the rotation of the pin about its axis.

25. In a machine of the type described, a conveyor and a string engaging device thereon for supporting a looped string and for advancing the same along a predetermined path, said string engaging device comprising a mounting member for supporting the device on the conveyor and having a bore therein extending transversely of the direction of travel of the conveyor, a member rotatably mounted in the bore and having a pin-like portion on its outer end which is slotted to receive the string, a cam member on said string receiving member adapted to be rotated to axially rotate said string receiving member, and resilient means for urging the string receiving member in a predetermined direction about its axis.

26. In a machine of the type described, a pair of laterally disposed conveyors having string carrying devices thereon adapted to move in oppositely disposed paired relation along a predetermined path with each pair thereof arranged to engage opposite ends of a looped string so as to support the string between them, each of said string carrying devices comprising a support member attached to the conveyor and having a bearing forming recess extending in a direction laterally of the path of travel of the conveyor, a member rotatably mounted in said bearing recess and having a notched outer end for engaging the looped string, means for resiliently urging said rotatably mounted member in a predetermined direction about its axis, cam means for turning said rotatably mounted member in the opposite direction, and stop means for limiting the turning movement of said rotatably mounted member.

27. In a machine as recited in claim 26 and the outer end of said rotatably mounted member having a notch therein for receiving the string which opens in a radial direction relative to the axis of rotation whereby turning the rotatable member turns the string to change the plane in which it extends.

28. In a machine for forming a hem in the end of a tubular bag section and encasing a looped drawstring therein, an upright supporting frame, a pair of elongate endless conveyors mounted on end supports which are arranged on spaced vertical axes on said frame so that opposed runs of the conveyor travel on opposite sides of a predetermined path, each of said conveyors having mounted thereon a series of pin members extending outwardly thereof and having hook-life end formations, said pin members being spaced on said conveyors to move along said path in oppositely disposed paired relation and to receive thereon a drawstring in the form of an elongate closed loop and a tubular bag section which has oppositely disposed apertures in the margin at the mouth forming end, the hook-like formation on a pin member being adapted to support the bag section in depending relation thereon, means on said frame at successive work stations along said path to grasp a bag section positioned on said pin and move the same onto the string, to open up the mouth of the bag section while it is suspended on the string, to fold the marginal portion of the bag mouth around the string and against adjacent portions of the bag walls and to secure the folded marginal portion to the bag walls thereby forming a hem with the string encased therein, and means below said conveyors for engaging the depending body portion of a bag section and for advancing the same along said path in timed relation to the movement of said pin members.

29. In a machine for applying a closure to the end of a flattened tubular bag section, which comprises a pair of spaced conveyors arranged for operation with opposed runs thereof traveling in parallel relation on opposite sides of a predetermined path, bag supporting members carried on said conveyors for advancing said bag section to successive work stations along said path, means at successive work stations adjacent said conveyors for performing successive closure applying operations on the upper end of the bag section, a vacuum chamber arranged below the conveyors and having an apertured wall extending in vertical alignment along said path, a bag gripping conveyor mounted with a run thereof extending along said vertical wall and means to operate said bag gripping conveyor in timed relation with the bag supporting conveyors to guide the lower end of the bag section along said path.

30. Apparatus for forming a drawstring closure in the end of a flattened tubular bag section which is provided with aligned apertures adjacent the mouth forming end in opposed side wall portions thereof, said apparatus comprising a pair of laterally spaced endless conveyors arranged for operation in a horizontal plane with opposed runs thereof traveling in parallel relation and in the same direction on opposite sides of a predetermined path, string supporting members carried on said conveyors in paired relation for engaging a looped string at opposite ends and for advancing the looped string along said path to successive work stations, means adjacent said conveyors for supplying each pair of the string supporting members with a looped string and a bag section, a vertically reciprocating frame, means carried on said reciprocating frame at the successive work stations for moving each bag section onto a looped string suspended between the associated string supporting members so that the string extends through the apertures in the side walls thereof for opening up the mouth of the bag section, for folding marginal portions of the bag mouth inwardly over the string and for sealing said inwardly folded portions to adjacent portions of the walls of the bag section thereby to encase the string in a guideway forming hem with opposite looped ends of the string extending through the apertures at the edge of the mouth of the bag.

31. In a machine for forming a hem in the end of a tubular bag section and encasing a looped drawstring therein, a supporting structure, a pair of elongate endless conveyors mounted in laterally spaced relation on said supporting structure so that opposed runs of the conveyors travel in a horizontal plane on opposite sides of a predetermined path, each of said conveyors having mounted thereon a series of outwardly projecting string supporting members which are spaced on said conveyors to move along said path in oppositely disposed paired relation, each pair of said string supporting members being provided with a length of string in the form of an elongate closed loop and a tubular bag section which has oppositely disposed apertures in the margin at the mouth forming end through which the looped string extends, a frame mounted on said supporting structure and extending along said path, means to vertically reciprocate said horizontal frame in timed relation to the movement of said endless conveyors, and said frame having in longitudinal spaced relation thereon means for folding and sealing the top margins of each bag section to form a string encasing hem thereon.

32. In a machine for forming a hem in the end of a tubular bag section and encasing a looped drawstring therein, a supporting structure, a pair of elongate endless conveyors mounted in laterally spaced relation on said supporting structure so that opposed runs of the conveyors travel in a horizontal plane on opposite sides of a predetermined path, each of said conveyors having mounted thereon a series of outwardly projecting string supporting members which are spaced on said conveyors to move along said path in oppositely disposed paired relation, each pair of said string supporting members being provided with a length of string in the form of an elongate closed loop and a flattened tubular bag section which has oppositely disposed apertures in the margin at the mouth forming end through which the looped string extends, a frame mounted on said supporting structure and extending along said path, means to vertically reciprocate said frame in timed relation to the movement of said endless conveyors, and said frame having in longitudinal spaced relation thereon means for moving said bag section to the center of the looped string, means for opening the top of the bag section, means for folding the top margins of the bag section downwardly over the looped string to form a string encasing hem and means for sealing the hem forming margins to adjacent portions of the bag walls.

33. In a machine as recited in claim 32, and said means for moving said bag section to the center of the looped string comprising a cross frame on said reciprocating frame, a carriage movable thereon transversely of the machine, a pair of clamp jaws on said cross frame, and means for opening and closing said clamp jaws in timed relation to the reciprocating movement of said reciprocable frame to grasp the top of the bag section, move the same to the center of the looped string and release the bag section.

34. In a machine as recited in claim 32 and said means for spreading the top margins of the bag section comprising a cross frame on said reciprocating frame, a pair of carriages mounted on said cross frame for reciprocation toward and from each other transversely of the machine, vacuum boxes depending in spaced relation from said carriages, and means for reciprocating said carriages in timed relation to the movement of said reciprocating frame to position said vacuum boxes for engaging the outside surfaces of opposed top marginal wall portions of the bag section and for moving the same away from each other to spread the top of the bag section on the looped string on which it is supported.

35. In a machine as recited in claim 32 and means for folding the top margins of the bag section downwardly over the looped string comprising a cross frame mounted on said reciprocating frame, a pair of carriages mounted for reciprocation toward and from each other on said cross frame, folder fingers depending in spaced relation from said carriages and means for reciprocating said folder fingers in timed relation to the movement of said reciprocating frame to position said folder fingers for engaging outside of the open top marginal wall portions of the bag section and for moving inwardly and downwardly to fold the marginal wall portions downwardly over the legs of the looped string and form a string encasing hem.

36. In a machine as recited in claim 35 and said means for sealing said hem forming margins comprising a cross frame mounted on said reciprocating frame, a pair of carriages mounted for reciprocation toward and from each other transversely of the machine, a pair of anvil plates depending from said carriages, resilient means for normally urging said carriages toward each other, means for moving said carriages apart as said reciprocating frame is moved toward the top end of the bag section to position said anvil plates within the top of the bag section, sealing irons carried in pivotal relation on said cross frame, and means to pivot said sealing irons into engagement with the folded top margins of the bag section when the anvil plates are positioned within the top of said bag section whereby to form a seam in the hem forming marginal portions of said bag section.

No references cited.